US008469634B2

(12) United States Patent
Stenzel et al.

(10) Patent No.: US 8,469,634 B2
(45) Date of Patent: Jun. 25, 2013

(54) METHOD AND SYSTEM OF DEPTH TRIGGERS FOR MARINE GEOPHYSICAL SURVEY CABLE RETRIEVER SYSTEMS

(75) Inventors: Andre Stenzel, Sugar Land, TX (US); Youlin Hu, The Woodlands, TX (US)

(73) Assignee: PGS Geophysical AS, Lysaker (NO)

( * ) Notice: Subject to any disclaimer, the term of this patent is extended or adjusted under 35 U.S.C. 154(b) by 163 days.

(21) Appl. No.: 13/193,806

(22) Filed: Jul. 29, 2011

(65) Prior Publication Data
US 2013/0029548 A1  Jan. 31, 2013

(51) Int. Cl.
*F16L 1/12* (2006.01)
*B63G 8/14* (2006.01)

(52) U.S. Cl.
USPC .......................................... 405/171; 114/245

(58) Field of Classification Search
USPC ............ 441/2, 10; 114/245; 367/18; 405/171
See application file for complete search history.

(56) References Cited

U.S. PATENT DOCUMENTS

| | | | |
|---|---|---|---|
| 2,761,927 A * | 9/1956 | Szypulski | 200/83 C |
| 3,909,774 A * | 9/1975 | Pavey, Jr. | 367/18 |
| 4,823,325 A | 4/1989 | Cole, Jr. | |
| 4,928,262 A | 5/1990 | Neeley et al. | |
| 5,076,468 A | 12/1991 | Mackal | |
| 5,400,922 A | 3/1995 | Weinheimer et al. | |
| 5,404,339 A | 4/1995 | Cole, Jr. | |
| 5,509,576 A | 4/1996 | Weinheimer et al. | |
| 6,019,652 A | 2/2000 | Nielsen et al. | |
| 6,533,627 B1 | 3/2003 | Ambs | |
| 6,612,886 B2 | 9/2003 | Cole, Jr. | |
| 7,475,711 B2 | 1/2009 | Fawcett, Jr. et al. | |
| 2011/0049449 A1 | 3/2011 | Scott | |

OTHER PUBLICATIONS

Bal Seal Engineering, Inc. (n.d.). Retrieved from http://www.balseal.com/home (Jun. 6, 2011).

* cited by examiner

*Primary Examiner* — Stephen Avila

(57) ABSTRACT

Depth triggers for marine geophysical survey cable retriever systems. At least some of the illustrative embodiments are methods including causing a submerged geophysical survey cable to surface. The cause may include: moving a piston within a cylinder of a housing coupled to the geophysical survey cable, the moving of the piston responsive to pressure exerted on a face of the piston as the geophysical survey cable reaches or exceeds a predetermined depth, wherein the movement of the piston overcomes a force created by interaction between two materials, the force latches the piston in place at depths above the predetermined depth; and responsive to the piston overcoming the force that latches the piston deploying a mechanism that makes the geophysical survey cable more positively buoyant, the deploying responsive to movement of the piston.

28 Claims, 14 Drawing Sheets

METHOD AND SYSTEM OF DEPTH TRIGGERS FOR MARINE GEOPHYSICAL SURVEY CABLE RETRIEVER SYSTEMS

CROSS-REFERENCE TO RELATED APPLICATIONS

This application is related to copending and commonly assigned application Ser. No. 13/193,796 titled "Method and system of a marine geophysical survey cable retriever."

BACKGROUND

Marine survey systems are used to acquire data (e.g., seismic, electromagnetic) regarding Earth formations below a body of water such as a lake or ocean. The marine survey systems typically use a plurality of sensor streamers which contain one or more sensors disposed within an outer jacket.

In some situations, one or more sensor streamers may be disconnected from the survey system, the disconnection possibly caused by failure of a coupling mechanism or in some situations the sensor streamer may be severed (e.g., by the propeller of a passing vessel). In some failure scenarios, particularly with sensor streamers filled with alcohol or oil, the sensor streamer becomes negatively buoyant, thus tending to sink. In order to avoid complete loss of the sensor streamer, an inflatable balloon system may trigger (i.e., a retriever system), which causes the sensor streamer to surface.

BRIEF DESCRIPTION OF THE DRAWINGS

For a detailed description of exemplary embodiments, reference will now be made to the accompanying drawings in which.

NOTATION AND NOMENCLATURE

Figure 1:
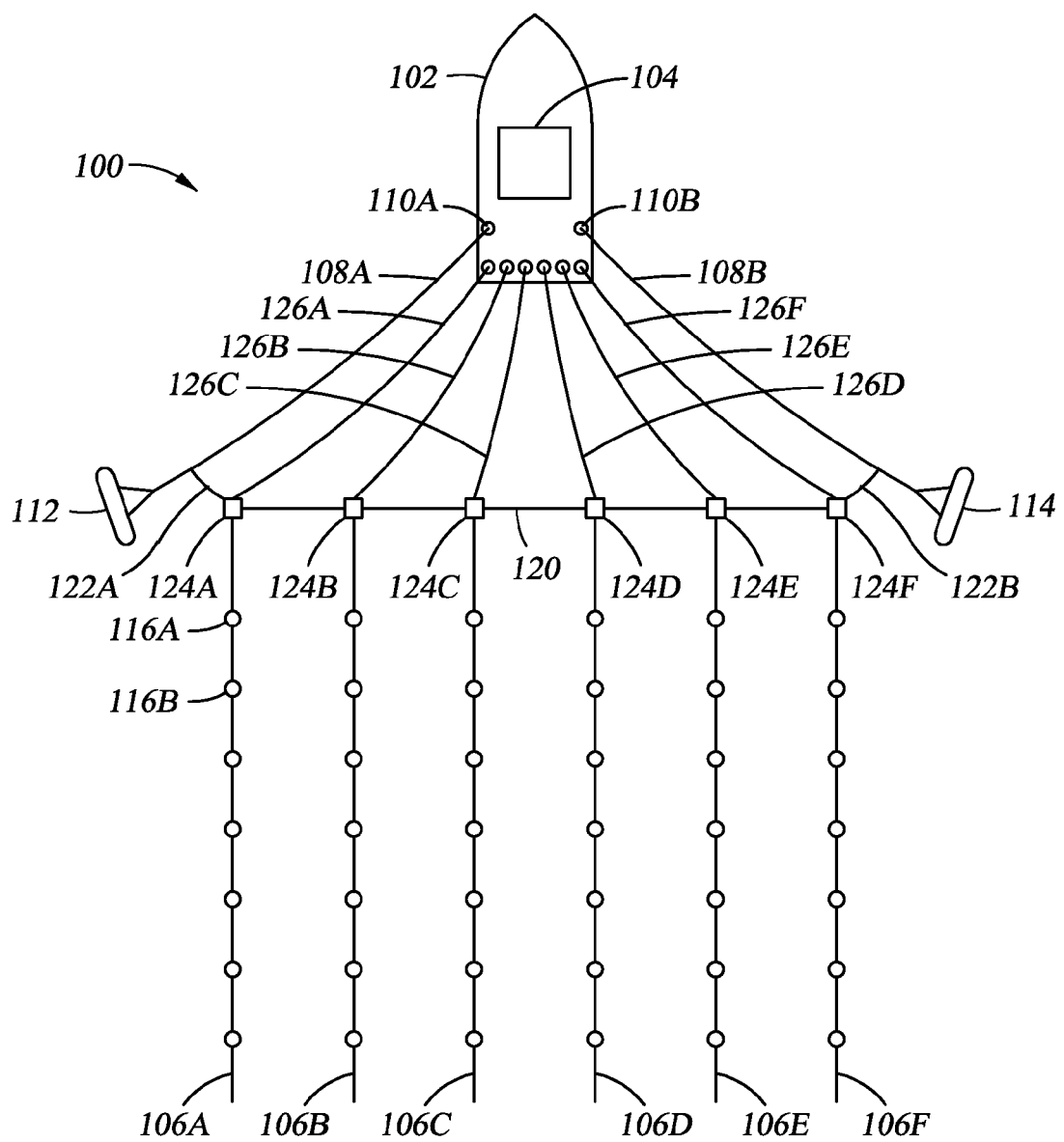
FIG. 1 shows an overhead view of marine survey system in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"About" shall mean plus or minus five percent (5%) of the recited value.

"Gas" in reference to a substance shall refer to the state of the substance at standard atmospheric pressure and temperature. The fact that a substance may be a liquid at certain pressures and/or temperatures shall not obviate the substance's status as a gas.

"Non-triggered" with respect to a depth trigger mechanism or components thereof shall mean that the depth trigger mechanism is armed and has yet to change operational state from the armed condition.

"Triggered" with respect to a depth trigger mechanism or components thereof shall mean that the depth trigger mechanism has changed operational state responsive to reaching or exceeding a predetermined depth.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Various embodiments are directed to retriever systems for geophysical survey cables used in marine surveys. More particularly, at least some embodiments are directed to depth trigger mechanisms for retriever systems including lifting bag systems, ballast weight systems, or both. The ballast weight system enables the user to compensate the cable for buoyancy changes caused by, for example, differences in salinity and temperature of the water within which the marine survey will be performed. However, the ballast weight system may also selectively shed or jettison the ballast weights when the survey cable reaches a predetermined depth indicative of potential loss. The ballast weight system may work in conjunction with a selectively deployable lifting bag system. The specification first turns to an illustrative marine survey system to orient the reader, and then to example embodiments.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more streamers 106A-F through the water. While FIG. 1 illustratively shows six streamers 106, any number of streamers 106 may be used. The discussion continues with respect to streamers 106 being sensor streamers, but streamers 106 are illustrative of any towed geophysical survey cable, such as transmitter cables and source cables.

The sensor streamers 106 are coupled to towing equipment that maintains the streamers 106 at selected depth and lateral positions with respect to each other and with respect to the survey vessel 102. The towing equipment may comprise two paravane tow lines 108A and 108B each coupled to the vessel 102 by way of winches 110A and 110B, respectively. The winches enable changing the deployed length of each paravane tow line 108. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120, or as illustrated couple to the spreader line by way of spur lines 122A and 122B.

The sensor streamers 106 are each coupled, at the ends nearest the vessel 102 (i.e., the proximal ends) to a respective lead-in cable termination 124A-F. The lead-in cable terminations 124 are coupled to or are associated with the spreader lines 120 so as to control the lateral positions of the streamers 106 with respect to each other and with respect to the vessel 102. Electrical and/or optical connections between the appropriate components in the recording system 104 and the sensors (e.g., 116A, 116B) in the streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed.

Figure 2:
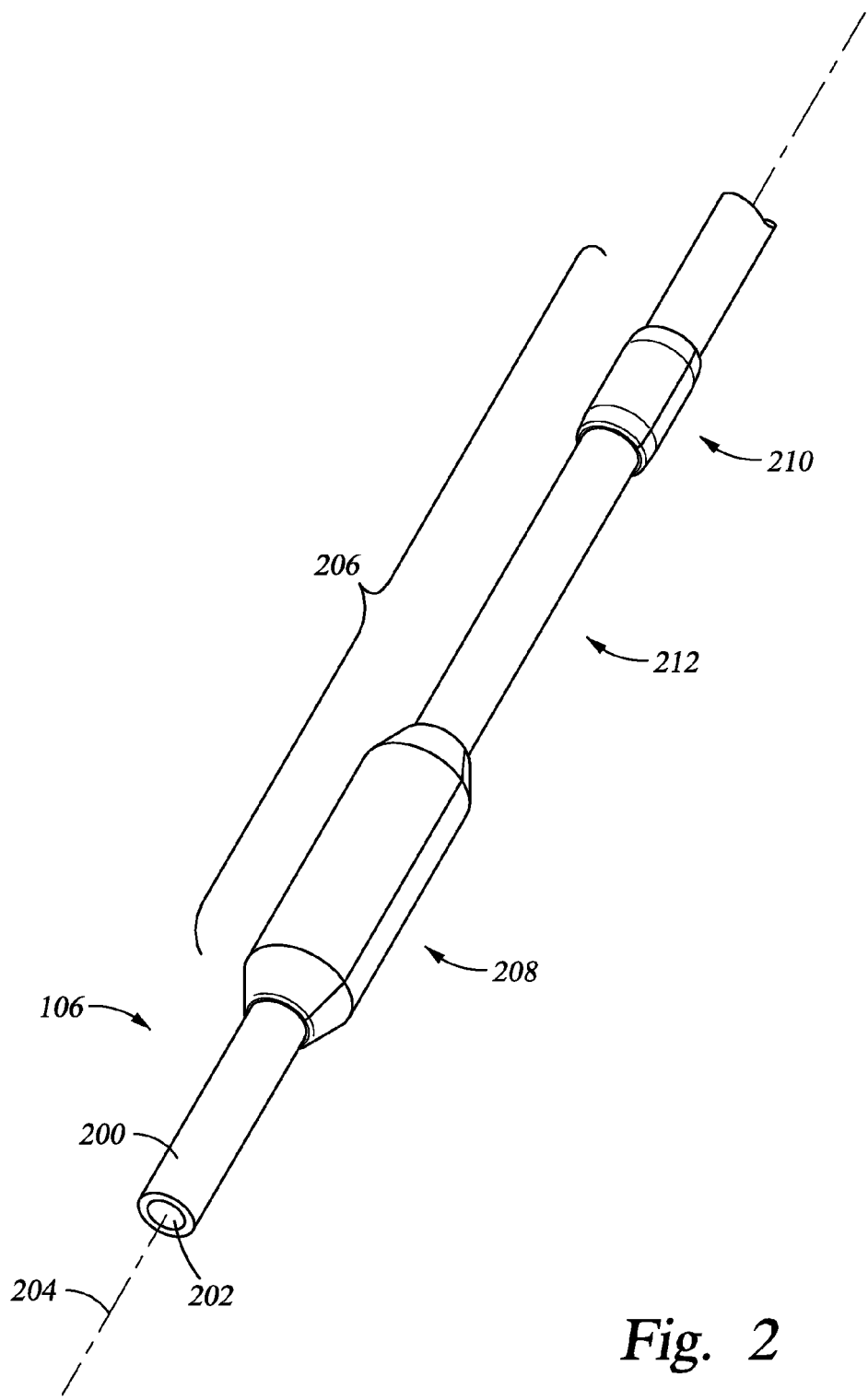
FIG. 2 shows a perspective view of a retriever system in accordance with at least some embodiments.

FIG. 2 shows a perspective view of a retriever system in accordance with at least some embodiments. In particular, FIG. 2 shows a portion of a sensor streamer 106. The sensor streamer 106 has an elongated outer jacket 200 that defines an interior volume 202. The elongated outer jacket defines a central axis 204. Though not specifically shown in FIG. 2, various sensors (e.g., hydrophones, geophones, electromagnetic sensors) associated with the sensor streamer 106 reside within interior volume 202 and are spaced longitudinally along the sensor streamer 106.

FIG. 2 further shows a retriever system 206 in accordance with at least some embodiments. In particular, retriever system 206 comprises a lifting bag system 208, and in some embodiments a ballast weight system 210. While FIG. 3 only shows one retriever system 206, it will be understood that a sensor streamer may have a length on the order of about 5000 to 15000 meters, and thus a plurality of such retriever systems 206 may be spaced along and thus associated with each sensor streamer 106. As illustrated, a portion 212 of the elongated outer jacket 200 may reside between the lifting bag system 208 and ballast weight system 210, and the portion 212 may comprise one or more sensors. In some cases, the retriever systems associated with a sensor streamer may be evenly spaced along the elongated outer jacket, and further the individual lifting bag systems and ballast weight systems evenly spaced, but such even spacing is not strictly required. The specification first turns to the lifting bag system 208 in accordance with various embodiments, and then turns to the ballast weight system 210.

Figure 3:
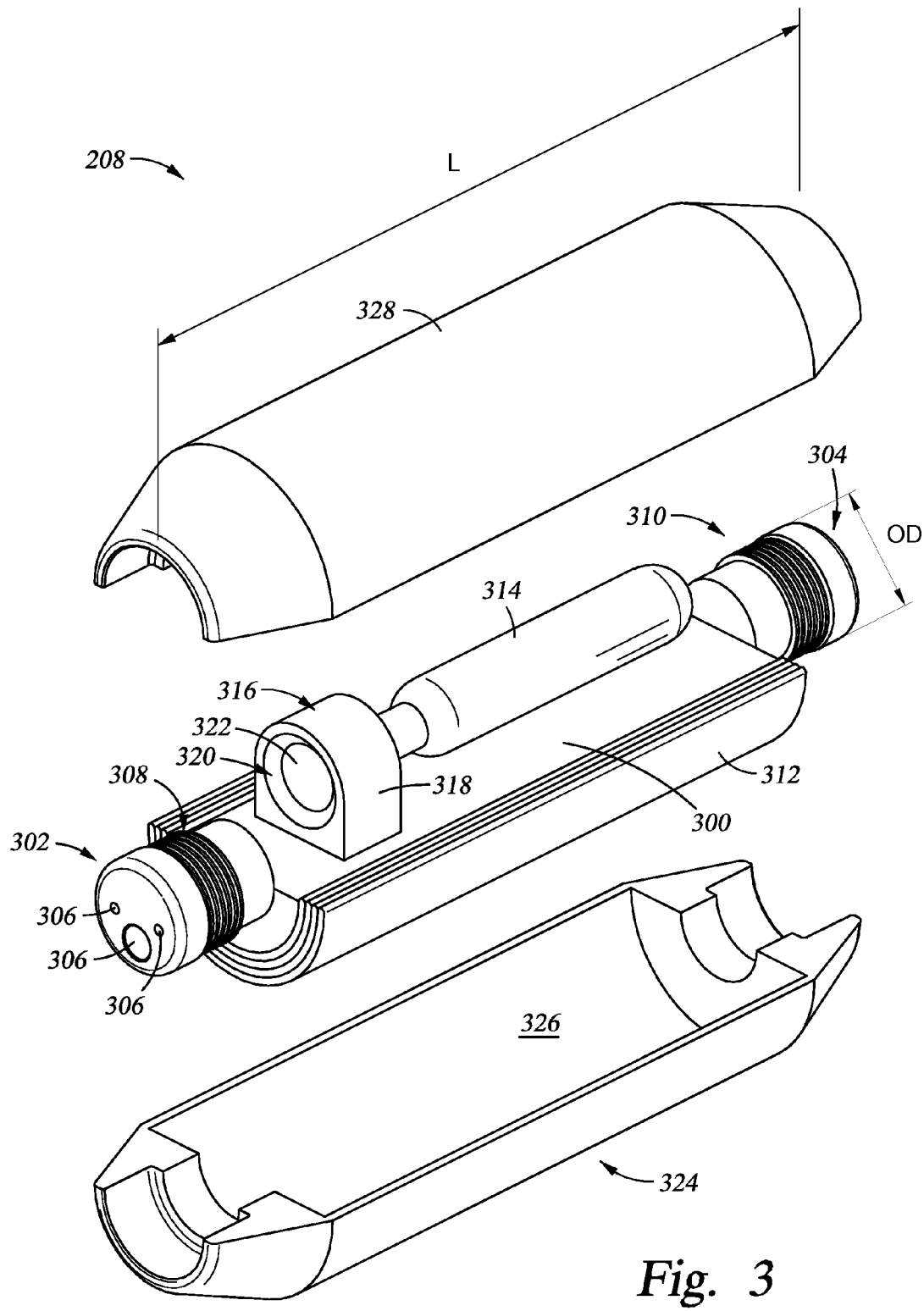
FIG. 3 shows an exploded perspective view of a lifting bag system in accordance with at least some embodiments.

FIG. 3 shows an exploded perspective view of a lifting bag system 208 (in a non-deployed condition) in accordance with at least some embodiments. In particular, the illustrative lifting bag system 208 comprises a bag attachment block 300 that defines a first end 302 and opposite second end 304, both of circular cross-sections. The bag attachment block defines a plurality of passages 306 that extend between the first end 302 and the second end 304 of the bag attachment block. It is through the passages 306 that various electrical and/or communicative conductors of the sensor streamer 106 pass, such that power may be provided to the sensors and/or readings taken from the sensors. The first end 302 and second end 304 define an outside diameter (OD) sized to couple to an inside diameter of the elongated outer jacket 200 of the sensor streamer 106. In some cases, the first end 302 and second end 304 may comprise a plurality of grooves 308 and 310, respectively, to assist in the coupling of the ends 302 and 304 to the elongated outer jacket 200. The grooves may take any suitable form, such as rectangular grooves, triangular grooves, or grooves similar to threads, just to name a few. The bag attachment block 300 (including the ends 302 and 304) may be made from any suitable material keeping in mind that the buoyancy of the sensor streamer (with the lifting bag system 208 in a non-deployed state) is designed to be approximately neutrally buoyant. Thus, the bag attachment block 300 may be made from materials such as high density plastic, or light metals such as titanium or aluminum. Other materials, and combinations of materials, may be also be used.

The lifting bag system 208 further comprises a bag 312. FIG. 3 shows the lifting bag system 208 with the bag in a deflated and stowed state. When deflated and stowed the bag 312 is folded such the amount of space used to store the bag within the lifting bag system 308 is reduced. The bag 312 in its inflated state may take any suitable shape, such as round or rectangular. When deployed, the bag itself may mechanically couple to the bag attachment block 300 and support the weight of the sensor streamer. In other cases, the bag may be held within a net or lattice of ropes mechanically coupled to the bag attachment block 300. The material from which the bag 312 is constructed may take any suitable form. In some cases, the bag 312 material may be a plastic material, plastic coated fabric, or water tight or water resistant material.

In order to inflate the bag 312 when needed, the lifting bag system 208 further comprises gas cylinder 314 coupled to the bag attachment block 300. The gas cylinder 314 comprises a compressed gas that, when selectively released by depth trigger mechanism 316, inflates the bag 312. The compressed gas within the cylinder 314 may take any suitable form, such as compressed air, compressed nitrogen, compressed carbon dioxide, or other gas. In at least some embodiments, the compressed gas is held at a pressure and temperature where the gas becomes a liquid. More particularly, in some embodiments the compressed gas in the cylinder 314 is liquid carbon dioxide.

The lifting bag system 208 further comprises a depth trigger mechanism 316. When the depth of the lifting bag system 208 meets or exceeds a predetermined depth, the depth trigger mechanism 316 fluidly couples the compressed gas from the gas cylinder 314 to the internal volume of the bag 312 such that the bag 312 inflates. Illustrative depth trigger mechanism 316 defines an outer housing 318 into which a cylinder bore 320 is created. Within the cylinder bore 320 resides a piston 322 which is exposed to the ambient pressure of the water. It is noted that being exposed to the ambient pressure does not necessarily mean the piston 322 is itself exposed to the water. Mechanisms for exposing the piston 322 to the ambient pressure without directly exposing the piston to the sea water are discussed more below. Generically stated, the trigger mechanism 316 is a mechanical system where increasing depth (i.e., increasing ambient pressure) moves the piston 322, which movement punctures a seal of the gas cylinder 314, which couples the compressed gas to the bag 312. Various trigger mechanisms are discussed more below.

Still referring to FIG. 3, the lifting bag system 208 further comprises outer cover 324. In some embodiments, the outer cover 324 is a single frangible unit designed and constructed to break away as the bag 312 begins to inflate. Illustrative outer cover 324 is shown as comprising two halves 326 and 328. The covers 326 and 328 may couple to each other and/or a portion of the bag attachment block 300 as appropriate. In a particular embodiment, the outer covers 326 and 328 are designed and constructed to separate from each other as the bag 312 begins to inflate. In another embodiment, the outer covers 326 and 328 are assembled to form the overall outer cover 324 but may be frangible, breaking into smaller pieces as the bag 312 begins to inflate. The outer cover may be made of any suitable material, such as a plastic material.

Figure 4:
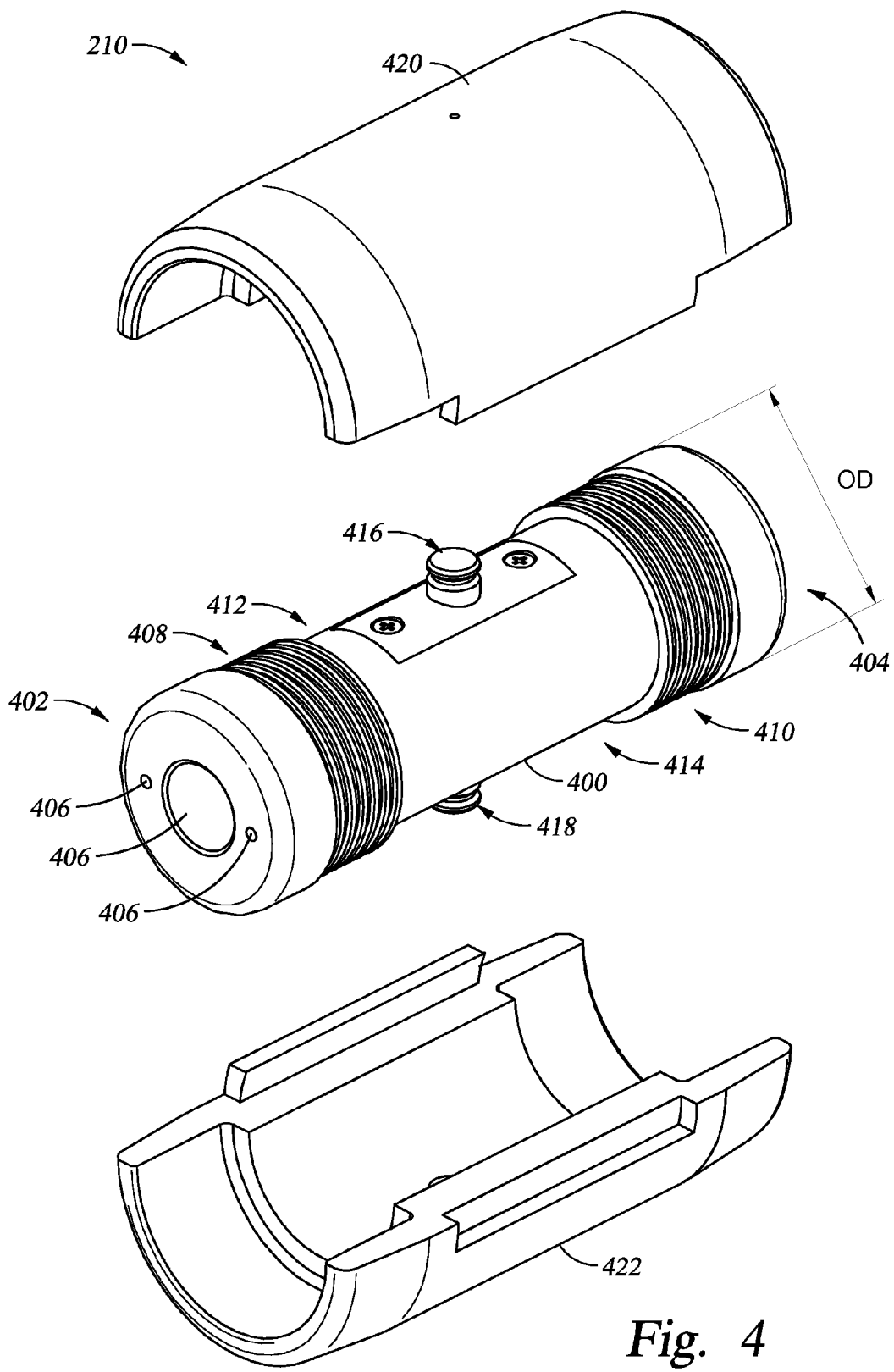
FIG. 4 shows an exploded perspective view of ballast system in accordance with at least some embodiments.

The retriever system 206 in accordance with at least some embodiments further comprises a ballast system 210. FIG. 4 shows an exploded, perspective view of a ballast system 210 in accordance with at least some embodiments. In particular, the illustrative ballast system 210 comprises a ballast attachment block 400 that defines a first end 402 and opposite second end 404, both of circular cross-section. The ballast attachment block defines a plurality of passages 406 that extend between the first end 402 and the second end 404. It is through the passages 406 that various electrical and/or communicative conductors of the sensor streamer 106 pass. The first end 402 and second end 404 define an outside diameter (OD) sized to couple to an inside diameter of the elongated outer jacket 200 of the sensor streamer 106. In some cases, the first end 402 and second end 404 may comprise a plurality of grooves 408 and 410, respectively, to assist in the coupling of the ends 402 and 404 to the elongated outer jacket 200. The grooves may take any suitable form, such as rectangular grooves, triangular grooves, or grooves similar to threads, just to name a few. The ballast attachment block 400 (including the ends 402 and 404) may be made from any suitable material keeping in mind that the buoyancy of the sensor streamer is designed to be approximately neutrally buoyant. Thus, the ballast attachment block 400 may be made from materials such as high density plastic, or light metals such as titanium or aluminum. Other materials, and combinations of materials, may be also be used.

Illustrative ballast attachment block 400 defines a first attachment location 412 and a second attachment location 414. In the illustrative embodiments of FIG. 4, the attachment locations are not necessarily structurally defined, except in relation to the depth trigger mechanisms 416 and 418, respectively (only the piston portion of depth trigger mechanisms 416 and 418 visible in FIG. 4). In other cases, the attachment locations 412 and 414 may be structurally delineated, such as by grooves, indentions, and/or areas of reduced diameter of the ballast attachment block 400.

The ballast system 210 further comprises a first ballast weight 420 and a second ballast weight 422. It is noted that while FIG. 4 shows the first ballast weight 420 in the upper orientation, and second ballast weight 422 in the lower configuration, any rotational orientation of the weights is possible. Though FIG. 4 is a perspective view, in an operational configuration the first ballast weight 420 abuts the ballast attachment block 400 at the first attachment location 412, and if used the second ballast weight 422 abuts the ballast attachment block 400 in the second attachment location 414. In the illustrative embodiments of FIG. 4, the ballast weights 420 and 422 mechanically couple to the ballast attachment block 400 by way of their depth trigger mechanisms 416 and 418, respectively. Example depth trigger mechanisms are discussed move below.

The ballast weights may be constructed of any suitable substance. For example, in some cases the ballast weights are lead or bronze. In at least some embodiments, each ballast weight 420, 422 weighs approximately 1 kilogram. Thus, if both ballast weights are attached to the ballast attachment block 400, the ballast system 210 may add approximately 2 kilograms to the overall weight of the attached sensor streamer. The ballast weights are added to ballast attachment blocks along the length of a sensor streamer to adjust the buoyancy of the sensor streamer. That is, the sensor streamer may be designed and constructed to be substantially neutrally buoyant in water of a particular salinity and temperature. However, marine surveys may be taken in a variety of locations and a variety of local conditions, and thus the ballast weights may be added and/or removed at the surface to compensate for the specific salinity and temperature of water expected. In cases where only one ballast weight is used at a particular ballast attachment block, a dummy cover, weighing substantially less than a ballast weight, may be placed at the unused attachment location.

Figure 5:
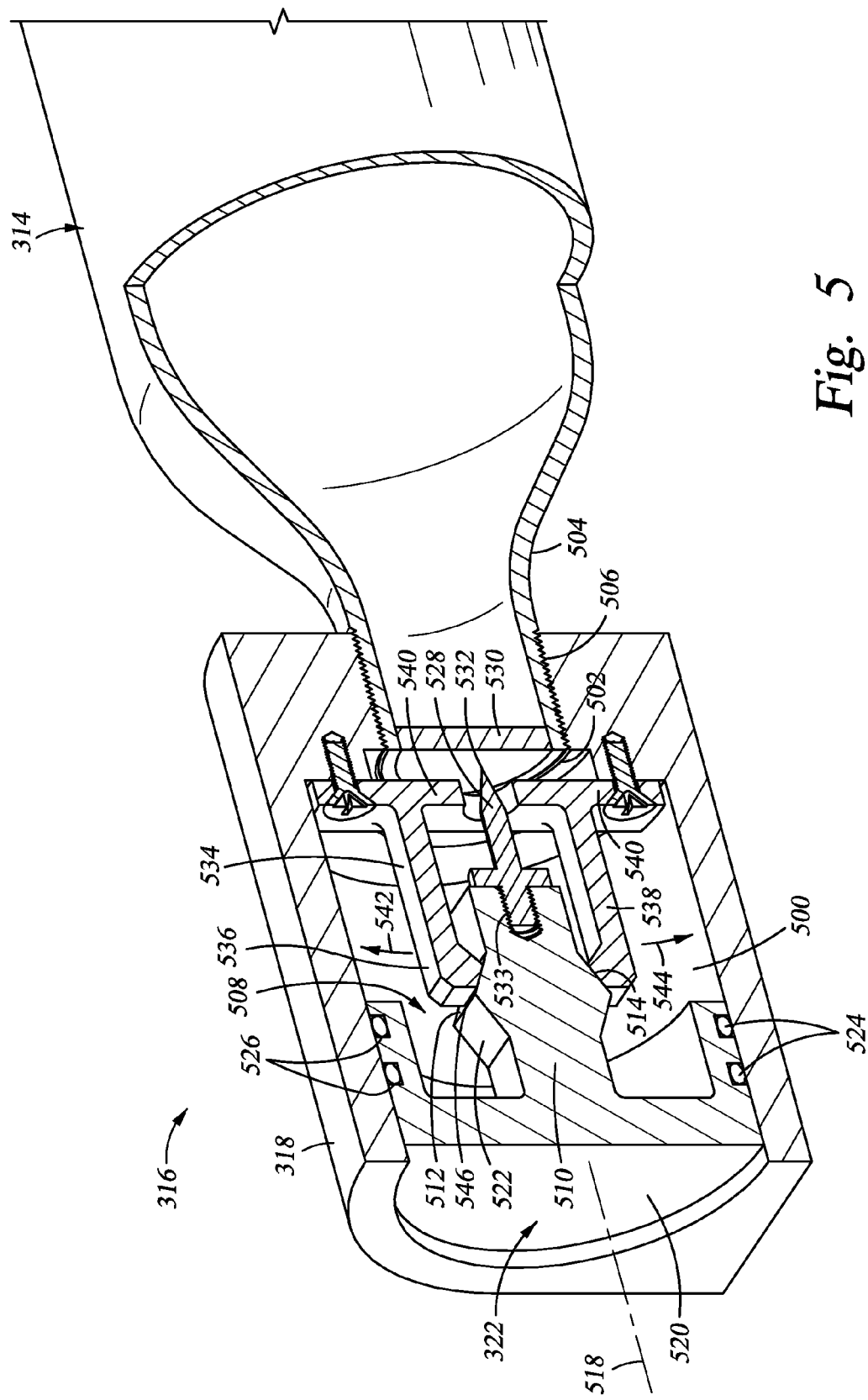
FIG. 5 shows a perspective cross-sectional view of a depth trigger mechanism for a lifting bag system in accordance with at least some embodiments.

The specification now turns to various embodiments of the depth trigger mechanisms, starting with the depth trigger mechanism for the lifting bag system 208. FIG. 5 shows a cross-sectional perspective view of a depth trigger mechanism 316 coupled to a gas cylinder 314 in accordance with at least some embodiments. In particular, the depth trigger mechanism 316 comprises outer housing 318. The outer housing may be made of any suitable material, but copper-based alloys (e.g., brass, beryllium copper) offer the best resistance to fouling by sea creatures, such as barnacles. A counter-bore within the outer housing 318 defines a cylinder bore 500 within which the piston 322 is located. For a depth trigger mechanism 316 designed to trigger at about 60 meters of depth and below, the cylinder bore 500 has an inside diameter of about 2.5 centimeters (cm), but larger or smaller inside diameters may be used.

The outer housing 318 further defines another counter bore 502 within which the neck 504 of the gas cylinder 314 may be inserted and coupled. In some cases, the inside diameter of the counter bore 502 may be threaded, and likewise the outside diameter of the neck 504 of the gas cylinder may be threaded, and thus the gas cylinder 314 couples to the outer housing 318 by way of a threaded connection 506. Other mechanisms to couple the gas cylinder 314 to the outer housing 318 may be used.

Still referring to FIG. 5, the piston 322 in accordance with the illustrated embodiments comprises a counter bore 508 within which interaction member 510 is coupled. The interaction member 510 defines one more interaction surfaces, and as illustrated interaction surfaces 512 and 514 (only interaction surface 512 visible in FIG. 5). Speaking to interaction surface 512 as illustrative of both interaction surfaces, interaction surface 512 defines a plane. If the plane is extended beyond the interaction surface 512, the plane intersects the central axis 518 of the piston at an acute angle. Stated otherwise, an angle formed between the central axis 518 of the piston and a plane defined by the interaction surface 512 is an acute angle in the direction of the outer face 520 of the piston. The interaction member 510 further defines a triggered surface 522 that abuts the interaction surface 512. The triggered surface 522 also defines a plane that forms an acute angle with the central axis 518, and forms an obtuse angle with the plane of the interaction surface 512. As will be discussed more below, the interaction surface 512 interacts with the spring member to latch the piston in a non-triggered state until depth of the depth trigger mechanism reaches or exceeds a predetermined depth.

An outside diameter of the piston 322 seals against the inside diameter of the cylinder bore 500 by way of o-rings 524 within respective annular grooves 526. While FIG. 5 shows two annular grooves 526 and two o-rings 524, one or more o-ring and annular groove systems may be used. While the o-rings 524 seal against the inside diameter of the cylinder bore 500, the o-rings nevertheless enable movement of the piston 322 within the cylinder bore 500. That is, as the pressure increases against the outer face 520 of the piston 322, the piston is pushed inwardly into the cylinder bore 500. Likewise, when the depth trigger mechanism is triggered at depth, the pressure released within the cylinder bore 500 may tend to push the piston 322 outwardly.

The depth trigger mechanism 316 illustrated in FIG. 5 further comprises lance member 528 coupled to the piston 322 and disposed within the outer housing 318. As the name implies, the lance member 528 is used to lance or puncture the seal of the gas cylinder 314 when the depth trigger mechanism 316 reaches or exceeds the predetermined depth. While in some cases at least the outer face 520 and outside diameter of the piston 322 is made of copper-based allows to reduce fouling by sea creatures, the lance member 528 is made of hardened steel. As illustrated, the lance member 528 couples to the piston 322 (in the illustrated case by way of the interaction member 510) by way of a counter bore 533. In some cases the counter bore 533 is internally threaded, and the lance member 528 is externally threaded, and thus the lance member 528 couples by way of a threaded connection. Other connection mechanisms are possible. The lance member 528 defines a sharpened point 532, which in the illustrative case of FIG. 5 is in the form of a spear. The lance member 528 may also be shaped in other forms to shear, puncture, and/or pierce open the seal of the cylinder containing compressed gas.

The depth trigger mechanism 316 of FIG. 5 is shown in the non-triggered state (i.e., the lance member 528 has not punctured the seal 530). The piston 322 and lance member 528 are held in the non-triggered state by a latching force illustratively created between two metallic members. In the embodiments of the FIG. 5, the two metallic members are the interaction member 510 (and particularly the interaction surfaces 512 and 514) working against leaf spring member 534. In particular, leaf spring member 534 comprises a first leaf spring 536 and a second leaf spring 538. Each leaf spring 536 and 538 defines a fixed proximal end (as illustrated at base 540), and a distal end near the interaction member 510. The distal ends of the leaf springs 536 and 538 are each in operational relationship (i.e., abutting, contacting) the interaction surfaces 512 and 514. The operational relationship of the leaf springs 536 and 538 with the interaction surfaces 512 and 514 creates a force tending to oppose movement of the piston 322 into the cylinder bore 500. The force created is thus referred to as the latching force holding the piston in the non-triggered state.

As the illustrative depth trigger mechanism 316 gets progressively deeper in water, the water pressure on the outer face 520 of the piston 322 increases, while the pressure within the cylinder bore 500 behind the piston stays relatively constant. The differential pressure experienced by the piston 322 tends to move the piston into the cylinder bore 500; however, the latching force created by the interaction between the leaf springs 536 and 538 on the interaction surfaces 512 and 514, respectively, partially resists the movement. It is to be understood that the latching force created holds the piston 322 in the non-triggered state, but the non-triggered state is not characterized by a lack of movement of the piston 322 into the cylinder bore 500. Rather, the non-triggered state in these embodiments is characterized by the leaf springs 536 and 538 being in operational relationship with the interaction surfaces 512 and 514, respectively. The piston 322 will move into the cylinder bore 500 with increasing depth, but given the relationship of the interaction surfaces 512 and 514 to the direction of movement, such movement tends to deflect the leaf springs 536 and 538 away from the central axis 518, the deflection illustrated by arrows 542 and 544, respectively. The deflection increases the amount of force applied to the interaction surfaces by the leaf springs, which thus increases the latching force.

At the predetermined depth or below, the pressure exerted on the outer face 520 of the piston 322 creates a force that overcomes the latching force created by the leaf springs 536 and 537, and the leaf springs are forced over the apex between the interaction surface and the triggered surface. Speaking directly to leaf spring 536 as illustrative of both leaf springs, at the predetermined depth and below the leaf spring 536 is forced over the apex 546 created between the interaction surface 512 and the triggered surface 522. When this occurs, the latching force is lost and the depth trigger mechanism 316 is placed in a triggered state where the piston 322 extends into the cylinder bore 500 a sufficient distance for the lance member 528 to puncture the seal 530. In some cases, the angle of triggered surface 522, in combination with the spring force of leaf spring 536, helps provide the puncturing force for the lance 528. Once the seal is punctured, the gas in the gas cylinder 314 is released, flows into the cylinder bore 500 and into the air bag 312 (FIG. 3). The fluid connection between the cylinder bore 500 and the air bag 312 is not visible in the view of FIG. 5.

While FIG. 5 shows the leaf spring member 534 comprising two leaf springs 536 and 538, such a system is merely illustrative. In some cases, particularly triggering at shallower depths or in situations where the piston 322 has a smaller outside diameter, a single leaf spring and correspondingly a single interaction surface may be used. Moreover, in illustrative FIG. 5 the leaf spring member 534 is axially stationary relative to the housing 318 (i.e., rigidly coupled), and the interaction member 510 moves with the piston. However, in other embodiments the leaf spring member may move with the piston, and the interaction member may be rigidly coupled to the housing, as shown in FIG. 6.

Figure 6:
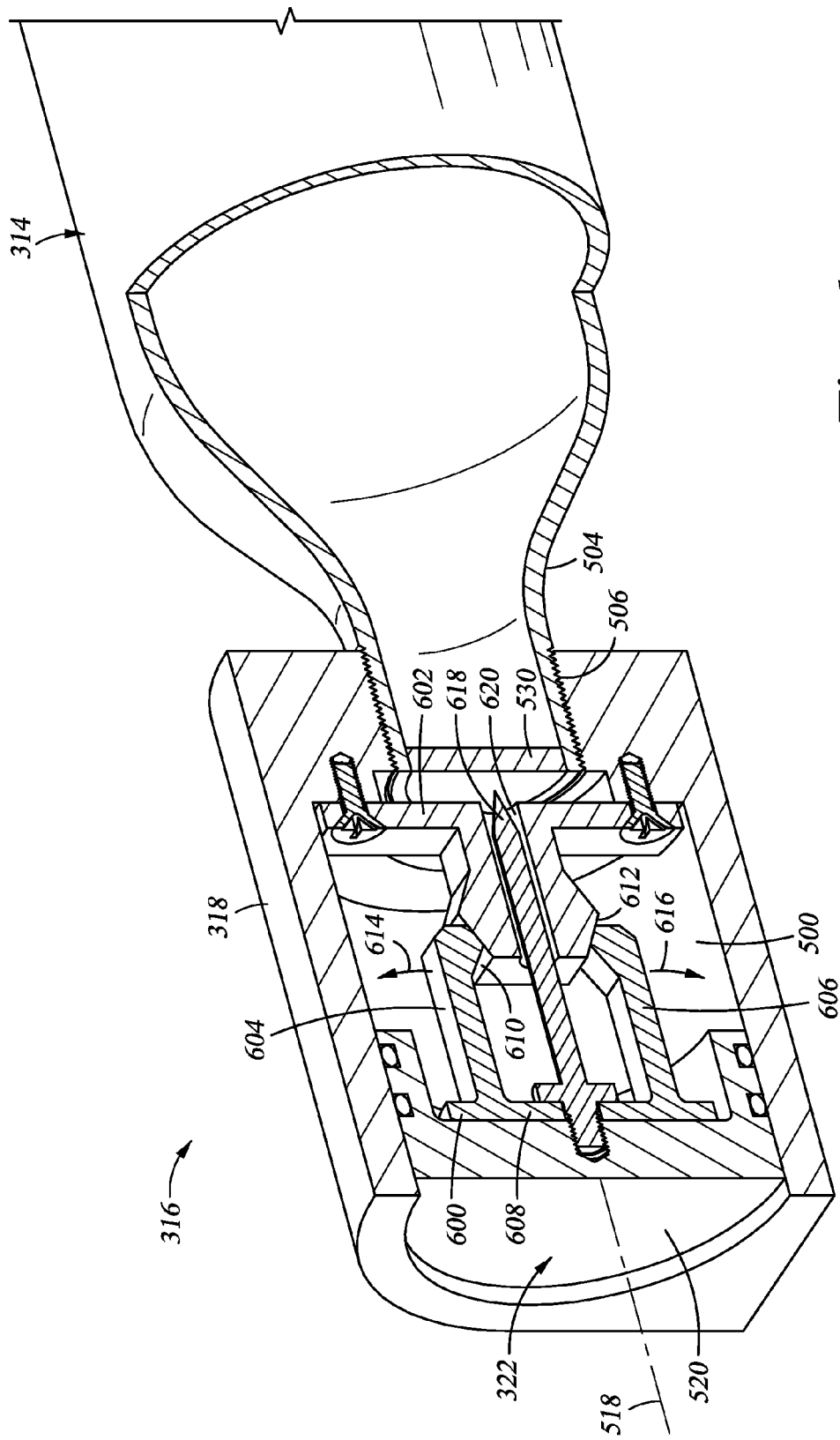
FIG. 6 shows a perspective cross-sectional view of a depth trigger mechanism for a lifting bag system in accordance with at least some embodiments.

FIG. 6 shows a depth trigger mechanism 316 in accordance with alternative embodiments. For the depth trigger mechanism 316 in the embodiments of FIG. 6 (shown in the non-triggered state) the latching force is again created between a leaf spring member and an interaction member, but the leaf spring member moves with the piston 322 and the interaction member is rigidly coupled to the outer housing 318. In particular, the illustrative embodiments of FIG. 6 comprise a leaf spring member 600 and an interaction member 602. Leaf spring member 600 comprises a first leaf spring 604 and a second leaf spring 606. Each leaf spring 604 and 606 defines a fixed proximal end (as illustrated at base 608), and a distal end near the interaction member 602. The distal ends of the leaf springs 604 and 606 are each in operational relationship (i.e., abutting, contacting) the interaction surfaces 610 and 612 (only interaction surface 610 is visible in FIG. 6). Referring to interaction surface 610 as illustrative of both interaction surfaces, the interaction surface defines a plane that, if extended beyond the interaction surface, intersects the central axis 518 of the piston 322 at an acute angle, but in this case the acute angle is on the side opposite the outer face 520 of the piston.

As the illustrative depth trigger mechanism 316 of FIG. 6 gets progressively deeper in water, the water pressure on the outer face 520 of the piston 322 increases, while the pressure within the cylinder bore 500 behind the piston stays relatively constant. The differential pressure experienced by the piston 322 tends to move the piston into the cylinder bore 500; however, the latching force created by the interaction between the leaf springs 604 and 606 on the interaction surfaces 610 and 612, respectively, partially resists the movement. Here again, it is to be understood that the latching force created holds the piston 322 in the non-triggered state, but the non-triggered state is not characterized by a lack of movement of the piston 322 into the cylinder bore 500. Rather, the non-triggered state in these embodiments is characterized by the leaf springs 604 and 606 being in operational relationship with the interaction surfaces 610 and 612, respectively. The piston 322 moves into the cylinder bore 500 with increasing depth, but given the relationship of the interaction surfaces 512 and 514 to the direction of movement, such movement tends to deflect the leaf springs 604 and 606 away from the central axis 518, the deflection illustrated by arrows 614 and 616, respectively. The deflection increase the amount of force applied to the interaction surfaces by the leaf springs, which thus increases the latching force.

In the embodiments of FIG. 6, however, the leaf spring member 600 is rigidly coupled to the piston such that the leaf spring member 600 moves with the piston. The interaction member 602 is rigidly coupled to the outer housing, and thus remains stationary with the respect to the outer housing 318. Creation of the latching force, and overcoming of the latching force otherwise operates the same as discussed with the respect to FIG. 5. In the embodiments of FIG. 6, the lance member 618 rigidly couples to the piston 322 and extends through an aperture 620 through the interaction member 602 and the housing 318. When the pressure moves the piston a sufficient distance such that the distal ends of the leaf springs 604 and 606 are no longer in contact with the interaction surfaces, the lance member 618 punctures the seal 530. Once the seal is punctured, the gas in the gas cylinder 314 is released, flows into the cylinder bore 500 and into the air bag 312 (FIG. 3). The fluid connection between the cylinder bore 500 and the air bag 312 is not visible in the view of FIG. 6.

While FIG. 6 shows the leaf spring member 600 comprising two leaf springs 604 and 606, such a system is merely illustrative. In some cases, particularly triggering at shallower depths or in situations where the piston 322 has a smaller outside diameter, a single leaf spring and correspondingly a single interaction surface may be used. The leaf springs of illustrative FIGS. 5 and 6 deflect outwardly with movement of the piston into the cylinder bore when still in the non-triggered state; however, in other embodiments the springs may deflect inwardly with movement of the piston into the cylinder bore when in the non-triggered state.

Figure 7:
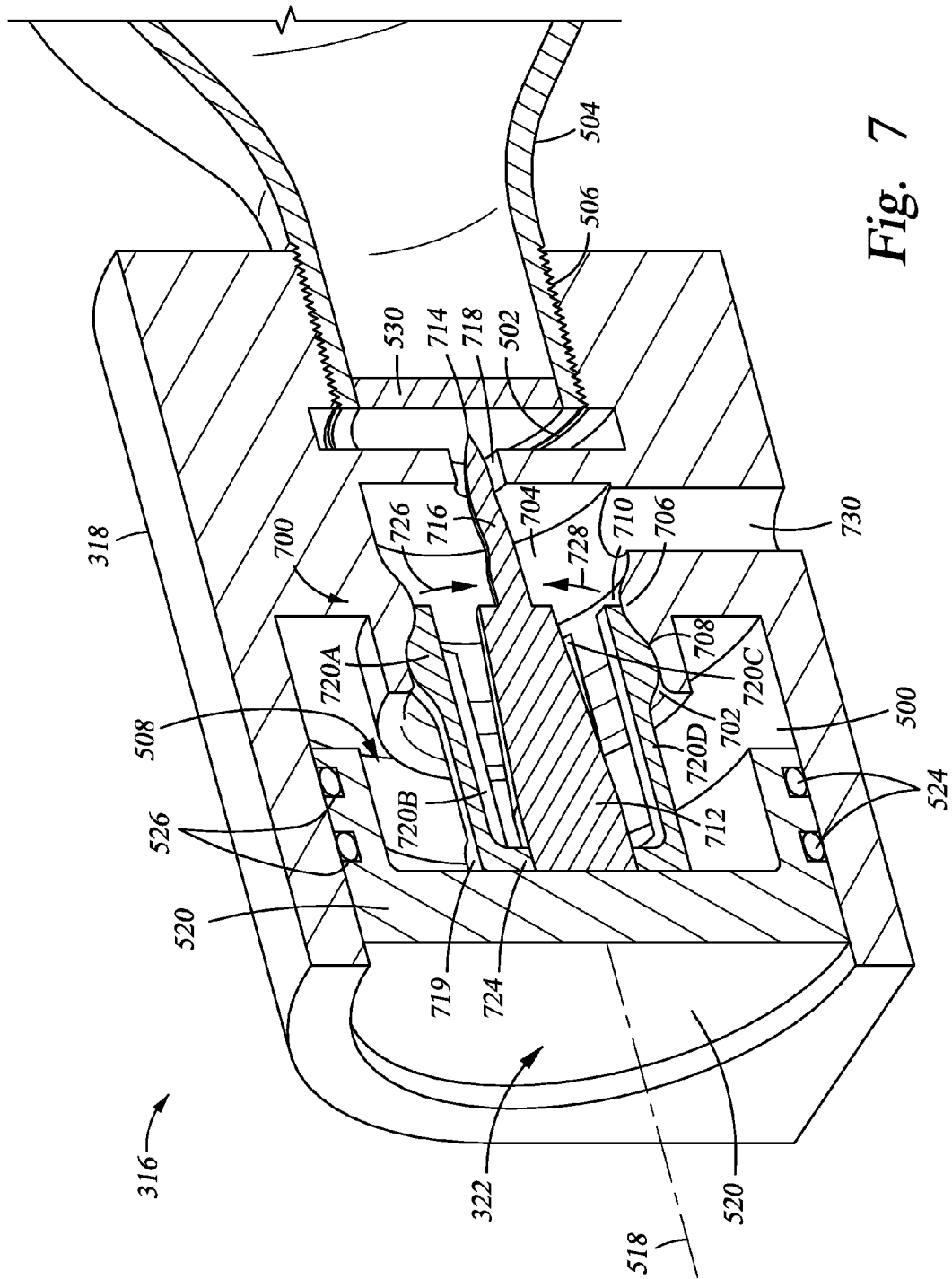
FIG. 7 shows a perspective cross-sectional view of a depth trigger mechanism for a lifting bag system in accordance with at least some embodiments.

FIG. 7 shows a cross-sectional perspective view of a depth trigger mechanism 316 coupled to a gas cylinder 314 in accordance with yet still further embodiments. In particular, the depth trigger mechanism 316 comprises outer housing 318. As before, the outer housing may be made of any suitable material, such as copper-based alloys (e.g., brass, beryllium copper). A counter-bore within the outer housing 318 defines a cylinder bore 500 within which the piston 322 is located. Also as before, for a depth trigger mechanism 316 designed to trigger at about 60 meters of depth and below, the cylinder bore 500 has an inside diameter of about 2.5 cm, but larger or smaller inside diameters may be used.

The outer housing 318 further defines another counter bore 502 within which the neck 504 of the gas cylinder 314 may be inserted and coupled. In some cases, the inside diameter of the counter bore 502 may be threaded, and likewise the outside diameter of the neck 504 of the gas cylinder may be threaded, and thus the gas cylinder 314 couples to the outer housing 318 by way of a threaded connection 506. Other mechanisms to couple the gas cylinder 314 to the outer housing 317 may be used.

Still referring to FIG. 7, interaction member 700 defines one more interaction surfaces. In the embodiment of FIG. 7, the interaction surfaces are formed by annular groove 702, which is formed on an inside diameter of the cylinder bore, and as illustrated in FIG. 7 the annular groove 702 is formed on the inside diameter of a reduced diameter portion 704. In the illustrative case of FIG. 7, it may be alternatively stated that the annular groove 702 is formed by an annular protrusion 706. Regardless of how defined, the annular groove 702 defines an annular interaction surface 708. The interaction surface 708 forms a conic frustum that has its larger diameter portion facing the direction of the outer face 520 of the piston 322. The interaction member 700 further defines a triggered surface 710 that abuts the interaction surface 708. The triggered surface 710 also defines a conic frustum, but the larger diameter portion of the conic frustum faces away from the outer face 520 of the piston 322. As will be discussed more below, the interaction surface 702 interacts with the spring member to latch the piston in a non-triggered state until depth of the depth trigger mechanism reaches or exceeds a predetermined depth.

An outside diameter of the piston 322 seals against the inside diameter of the cylinder bore 500 by way of o-rings 524 within respective annular grooves 526. While FIG. 7 shows two annular grooves 526 and two o-rings 524, one or more o-ring and annular groove systems may be used. While the o-rings 524 seal against the inside diameter of the cylinder bore 500, the o-rings nevertheless enable movement of the piston 322 within the cylinder bore 500. That is, as the pressure increases against the outer face 520 of the piston 322, the piston is push inwardly into the cylinder bore 500. Likewise, when the depth trigger mechanism is triggered at depth, the pressure released within the cylinder bore 500 may tend to push the piston 322 outwardly.

The depth trigger mechanism 316 illustrated in FIG. 7 further comprises lance member 712 coupled to the piston 322 and disposed within the outer housing 318. As the name implies, the lance member 712 is used to lance or puncture the seal of the gas cylinder 314 when the depth trigger mechanism 316 reaches or exceeds the predetermined depth. In some cases the lance member 712 is made of hardened steel. The lance member 712 couples to the piston 322 by any suitable mechanism. The lance member 712 defines a sharpened point 714, which in the illustrative case of FIG. 7 is in the form of a spear. Moreover, illustrative lance member 712 also comprises an undulation 716. The undulation forms a wider path for movement of the gas released from the cylinder 314 to pass between the lance member 712 and the aperture 718 through which the lance passes to reach the seal 530. The lance member 528 may also be shaped in other forms to shear, puncture, and/or pierce open the seal of the cylinder containing compressed gas.

The depth trigger mechanism 316 of FIG. 7 is shown in the non-triggered state (i.e., the lance member 712 has not punctured the seal 530). The piston 322 and lance member 712 are held in the non-triggered state by a latching force illustratively created between two metallic members. In the embodiments of the FIG. 7, the two metallic members are the interaction member 700 (and particularly the interaction surface 708) working against leaf spring member 719. In particular, leaf spring member 719 comprises a plurality of leaf springs 720 (the leaf springs visible in FIG. 7 are labeled 720A-720D). Each leaf spring 720 defines a fixed proximal end all coupled by a ring portion 724 (abutting the blind end of the counter bore 508 in the piston 322), and a distal end near the interaction member 700. The leaf springs 720 may be referred to as a collet spring, and visually has the appearance of a crown, with the ring 724 forming the base portion, and the leaf springs 720 all extending upward in the same direction from the ring 724. The distal ends of the leaf springs 720 are each in operational relationship (i.e., abutting, contacting) the interaction surface 708. The operational relationship of the leaf springs 720 with the interaction surface 708 creates a force tending to oppose movement of the piston 322 into the cylinder bore 500. The force created is again referred to as the latching force holding the piston in the non-triggered state.

As the illustrative depth trigger mechanism 316 gets progressively deeper in water, the water pressure on the outer face 520 of the piston 322 increases, while the pressure within the cylinder bore 500 behind the piston stays relatively constant. The differential pressure experienced by the piston 322 tends to move the piston into the cylinder bore 500; however, the latching force created by the interaction between the leaf springs 720 on the interaction surface 708 partially resists the movement. Here again, it is to be understood that the latching force created holds the piston 322 in the non-triggered state, but the non-triggered state is not characterized by a lack of movement of the piston 322 into the cylinder bore 500. Rather, the non-triggered state in these embodiments is characterized by the leaf springs 720 being in operational relationship with the interaction surface 708. The piston 322 will move into the cylinder bore 500 with increasing depth, but given the relationship of the interaction surface 708 to the direction of movement, such movement tends to deflect the leaf spring 720 toward the central axis 518, the deflection illustrated by arrows 726 and 728. The deflection increase the amount of force applied to the interaction surfaces by the leaf springs, with thus increases the latching force.

At the predetermined depth or below, the pressure 322 exerted on the outer face 520 of the piston 322 creates a force that overcomes the latching force created by the leaf springs 720, and the leaf springs are forced over the apex between the interaction surface 708 and the triggered surface 710. When this occurs, the latching force is lost and the depth trigger mechanism 316 is placed in a triggered state where the piston 322 extends into the cylinder bore 500 a sufficient distance for the lance member 712 to puncture the seal 530. Once the seal is punctured, the gas in the gas cylinder 314 is released, flows into the cylinder bore 500 and into the air bag 312 through the aperture 730.

In illustrative FIG. 7 the leaf spring member 719 moves axially relative to the housing 318, and the interaction member 700 is rigidly coupled to the housing. However, in other embodiments the interaction member 700 may be defined on the inside diameter of the counter bore 508, and the leaf spring member 719 may be rigidly coupled outer housing 318. The reversal still results in a depth trigger mechanism that triggers at the predetermined depth. The discussion now turns to embodiments where a radial spring provides the latching force.

Figure 8:
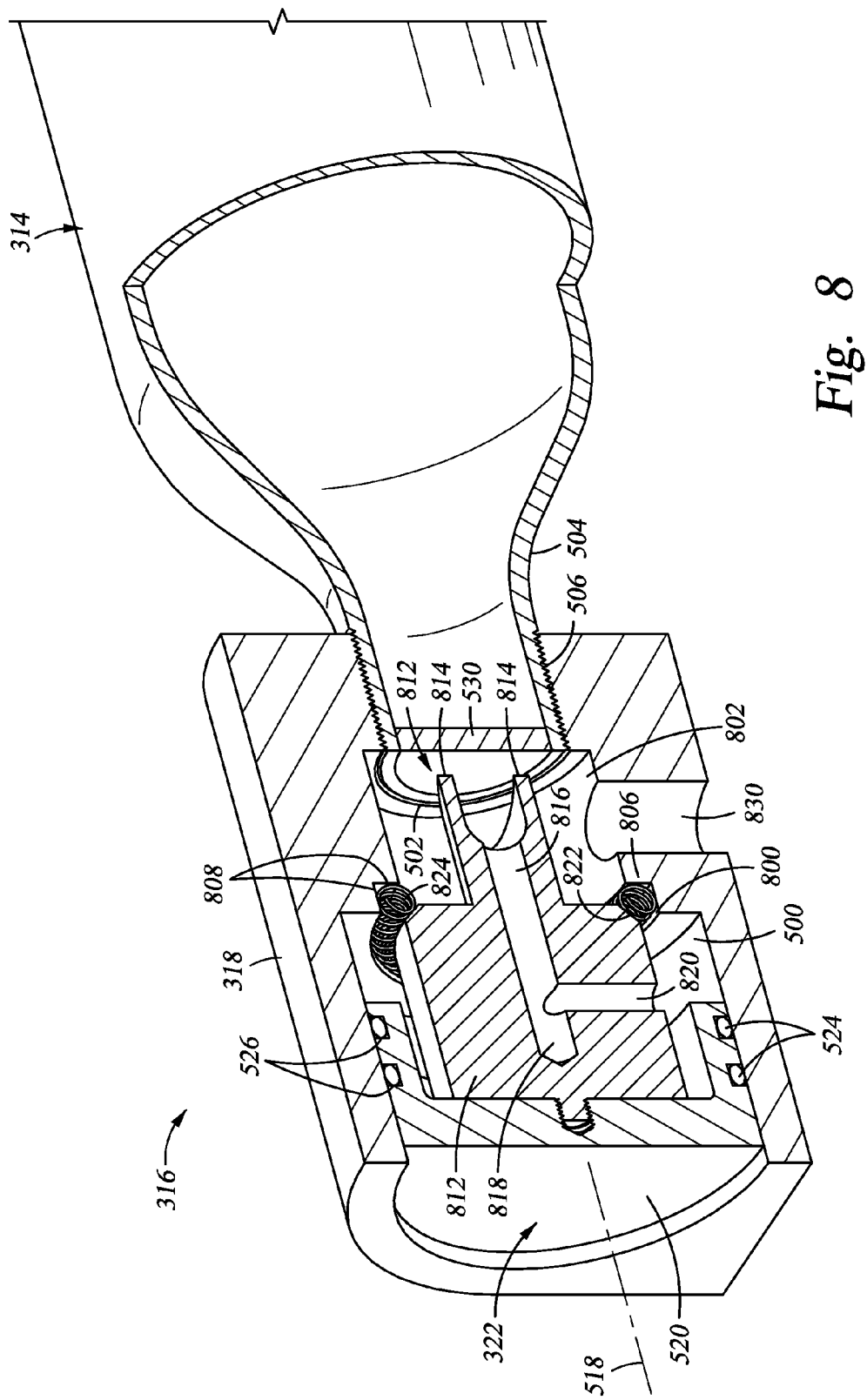
FIG. 8 shows a perspective cross-sectional view of a depth trigger mechanism for a lifting bag system in accordance with at least some embodiments.

FIG. 8 shows a cross-sectional perspective view of depth trigger mechanism 316 in accordance with yet still further embodiments. In particular, the depth trigger mechanism 316 comprises outer housing 318. As before, the outer housing may be made of any suitable material, such as copper-based alloys (e.g., brass, beryllium copper). A counter-bore within the outer housing 318 defines a cylinder bore 500 within which the piston 322 is located. Also as before, for a depth trigger mechanism 316 designed to trigger at about 60 meters of depth and below, the cylinder bore 500 has an inside diameter of about 2.5 cm, but larger or smaller inside diameters may be used.

The outer housing 318 further defines another counter bore 502 within which the neck 504 of the gas cylinder 314 may be inserted and coupled. In some cases, the inside diameter of the counter bore 502 may be threaded, and likewise the outside diameter of the neck 504 of the gas cylinder may be threaded, and thus the gas cylinder 314 couples to the outer housing 318 by way of a threaded connection 506. Other mechanisms to couple the gas cylinder 314 to the outer housing 317 may be used.

Still referring to FIG. 8, within the cylinder bore 500 is defined an annular groove 800. In the illustration of FIG. 8, the annular groove 800 is define as a shoulder region between a main area of the cylinder bore 500, and a reduced diameter region 802 of the cylinder bore 500. That is, as shown in the cross-section of FIG. 8, the line segments forming the walls of the annular groove form a right angle. Other arrangements for the annular groove are possible. For example, in other cases the annular groove defines a conic frustum with the larger diameter portion opening toward the piston 322, and the smaller diameter portioning opening toward the gas cylinder 314. In yet still further embodiments, the annular groove may fully defined within the reduced diameter portion 802, such as groove that defines any suitable cross-section (e.g., square, rectangular, or triangular). In the illustrative case of FIG. 8, it may be alternatively stated that the annular groove 800 is formed by an annular protrusion 806. Regardless of how defined, the annular groove 800 defines one or more interaction surface 808. As will be discussed more below, the interaction surface 808 interacts with a radial spring member to latch the piston in a non-triggered state until depth of the depth trigger mechanism reaches or exceeds a predetermined depth.

An outside diameter of the piston 322 seals against the inside diameter of the cylinder bore 500 by way of o-rings 524 within respective annular grooves 526. While FIG. 8 shows two annular grooves 526 and two o-rings 524, one or more o-ring and annular groove systems may be used. While the o-rings 524 seal against the inside diameter of the cylinder bore 500, the o-rings nevertheless enable movement of the piston 322 within the cylinder bore 500. That is, as the pressure increases against the outer face 520 of the piston 322, the piston is push inwardly into the cylinder bore 500. Likewise, when the depth trigger mechanism is triggered at depth, the pressure released within the cylinder bore 500 may tend to push the piston 322 outwardly.

The depth trigger mechanism 316 illustrated in FIG. 8 further comprises lance member 812 coupled to the piston 322 and disposed within the outer housing 318. As the name implies, the lance member 812 is used to lance or puncture the seal of the gas cylinder 314 when the depth trigger mechanism 316 reaches or exceeds the predetermined depth. In some cases the lance member 812 is made of hardened steel. The lance member 812 couples to the piston 322 by any suitable mechanism. The lance member 812 defines sharpened points 814. When the piston is moved by pressure on the outer face 520 to the triggered stated, the lance members 814 puncture the seal 530. Because of the mechanism by which the latching force is created, there may be some degree of sealing between the lance member 812 and the inside diameter of the cylinder bore 500. Thus, in the illustrative embodiments of FIG. 8 the lance member 812 defines an internal channel 816, comprising a portion 818 that is aligned axially with the central axis 518, and another portion 820 that fluidly couples the channel 816 to the volume in the central bore 500 defined between the piston 322 and the annular groove 800. The channel 816 may serve several purposes. One such purpose is to enable air trapped between the piston 322 and the annular groove 800 to move into other portions of the lifting bag system (e.g., the bag itself) as the piston moves under the force of the pressure applied to the outer face 520. Enabling the air to move to other portions of the lifting bag system prevents the trapped air from compressing and resisting movement of the piston. Another illustrative purpose is to enable gas from the gas cylinder 314, after the seal 530 has been punctured, to expand into the volume between piston 322 and the annular groove 800, thus possibly pushing the piston 322 and the sharpened points 814 away from the gas cylinder such that gas may more easily escape the punctures in the seal 530. The channel 816 may be omitted in other embodiments.

The depth trigger mechanism 316 of FIG. 8 is shown in the non-triggered state (i.e., the lance member 812 has not punctured the seal 530). The piston 322 and a rod defining lance member 812 are held in the non-triggered state by a latching force illustratively created between metallic members, and in the embodiments of the FIG. 8 the metallic members are a surface 822 defined on the lance member 812, the annular groove 800, and a radial spring 824 positioned within the annular groove 800 and in operational relationship to the surface 822 (which may be alternatively described as an annular groove at the distal end of the lance member 812). In particular, the surface 822 is defined on the lance member 822, and as illustrated the surface 822 may define a conic frustum with the larger diameter portion pointing toward the piston 322. Other shapes may be defined by the surface 822. Ambient pressure applied on the outer face 520 of the piston 322 pushes the surface 822 against the radial spring 824, which in turn pushes against the annular groove 800. One or both of the frictional forces between the radial spring 824, the surface 822, and annular groove 800, or spring force of the radial spring 824, create a force which resists movement of the piston. The force created is again referred to as the latching force holding the piston in the non-triggered state.

As the illustrative depth trigger mechanism 316 gets progressively deeper in water, the water pressure on the outer face 520 of the piston 322 increases, while the pressure within the cylinder bore 500 behind the piston stays relatively constant. The differential pressure experienced by the piston 322 tends to move the piston into the cylinder bore 500; however, the latching force created by the radial spring 824 and other components partially resists the movement. Here again, it is to be understood that the latching force created holds the piston 322 in the non-triggered state, but the non-triggered state is not characterized by a lack of movement of the piston 322 into the cylinder bore 500. Rather, the non-triggered state in these embodiments is characterized by the radial spring 824 being in operational relationship with at least one of the interaction surfaces 822 and 808. The piston 322 will move into the cylinder bore 500 with increasing depth, but given the relationship of the interaction surfaces 822 and 808 to the direction of movement, such movement tends to deform the radial spring 824. The deformation increases the amount of force applied to the interaction surfaces, which thus increases the latching force.

At the predetermined depth or below, the pressure 322 exerted on the outer face 520 of the piston 322 creates a force that overcomes the latching force created by the radial spring 824, and the interaction surface 822 is forced past the radial spring 824. When this occurs, the latching force is lost and the depth trigger mechanism 316 is placed in a triggered state where the piston 322 extends into the cylinder bore 500 a sufficient distance for the lance member 812 to puncture the seal 530. Once the seal is punctured, the gas in the gas cylinder 314 is released, flows into the cylinder bore 500 and into the air bag 312 through the aperture 830.

The various embodiments discussed to this point have been with respect to the depth trigger mechanism used in connection with the lifting bag system 208, puncturing a seal of the gas cylinder when the system reaches or exceeds the predetermined depth. However, the same principles of operation may be used with respect to the ballast weight system 210, though no lancing operation is needed with respect to the ballast weights.

Figure 9:
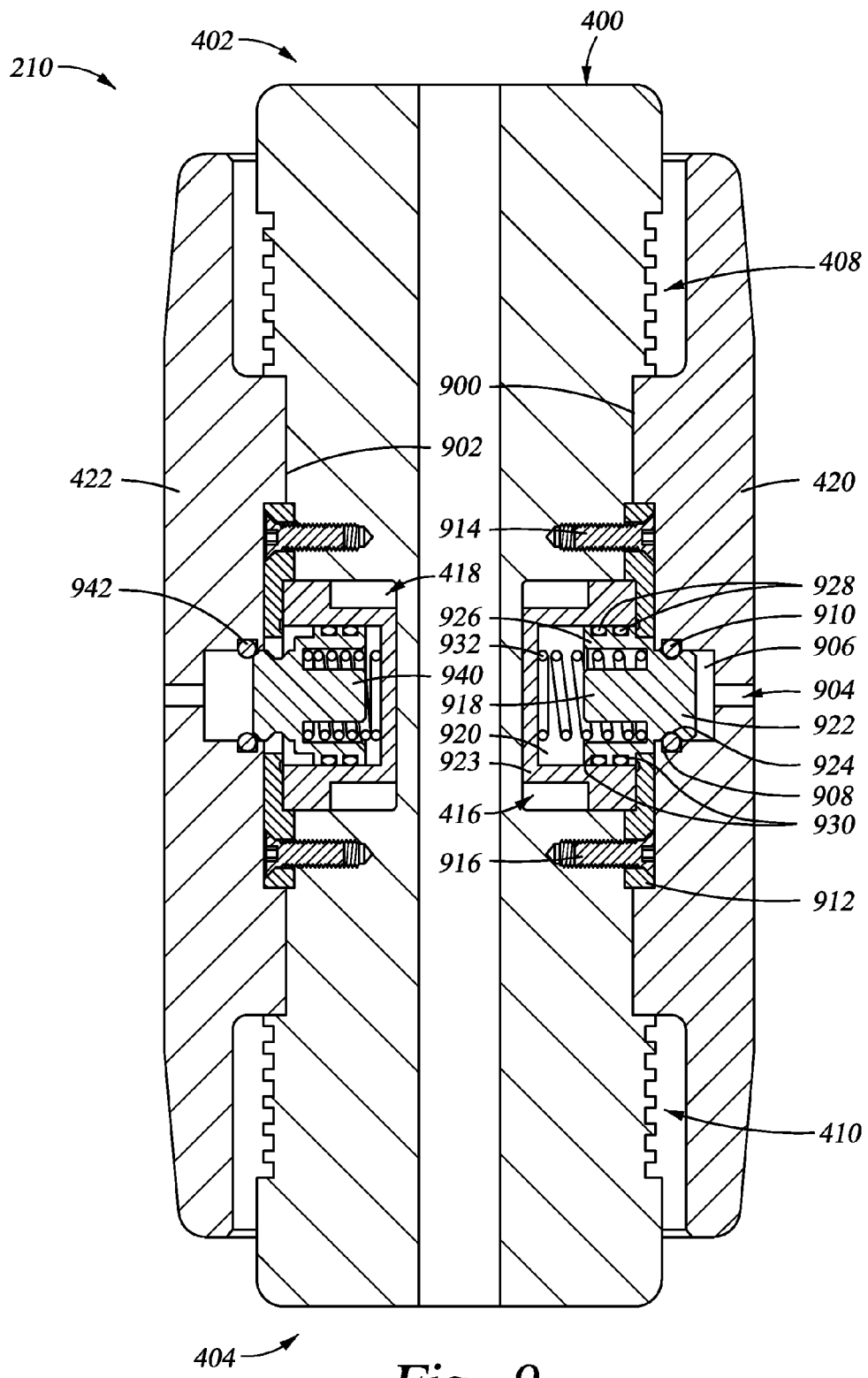
FIG. 9 shows a cross-sectional elevation view of a ballast system in accordance with at least some embodiments.

FIG. 9 shows a cross-sectional elevation view of a ballast system 210 in accordance with at least some embodiments. In particular, FIG. 9 shows the ballast attachment block 400 having the first ballast weight 420 and second ballast weight 422 in an abutting relationship with the ballast attachment block 400. The illustrated ballast attachment block 400 differs from that illustrated in FIG. 4 in that the attachment locations are more delineated, the delineation in the form of reduced outside diameter portions 900 and 902. Moreover, FIG. 9 illustrates that the grooves 408 and 410 may likewise define a smaller outside diameter than more distal portions of the first end 402 and second end 404, respectively. For example, the elongated outer jacket may telescope over and end 402 or 404, and then be held in place by a mechanical member, such as a band that circumscribes the elongated outer jacket at the location of the grooves.

Referring to ballast weight 420 as representative, ballast weight 420 comprises a first aperture 904 in fluid communication with a counter bore 906. As illustrated, the counter bore 906 may be circular and has an inside diameter larger than the first aperture 904, but other relationships are contemplated. The counter bore 906 in these embodiments defines an internal annular groove 908 within which a radial spring 910 is disposed. Illustrative groove 908 has a rectangular cross-section, but other cross-sectional shapes for the internal annular groove 908 (e.g., circular, triangular, or semi-circular) may be used.

Illustrative depth release mechanism 416 of FIG. 9 comprises retention plate 912, which may be attached to the ballast attachment block by way of fasteners within threaded apertures 914 and 916. While FIG. 9 illustrates the use of threaded fasteners, any suitable attachment system may be used. The retention plate retains the piston member 918 at least partially within a chamber 920. As illustrated, the chamber 920 is defined within a chamber block member 923, but in other cases the chamber 920 may be defined directly by a counter bore in the ballast attachment block 400. The piston member 918 defines a retention portion 922 having an external annular groove 924. Illustrative external annular groove 924 has a triangular cross-section, but other cross-sectional shapes for the external annular groove 924 (e.g., circular, rectangular, or semi-circular) may be used.

Still referring to FIG. 9, the piston member further comprises chamber portion 926 that resides within the chamber 920. As illustrated, the chamber portion 926 seals against the internal diameter of the chamber 920, for example, by way of o-rings 928 in respective grooves 930. Other sealing mechanisms may be used. Also within the chamber 920 is spring member in the form of a coil spring 932. The pressure of the gas (e.g., air) within the chamber, as well as the force created by compression of the illustrative coil spring 932, tend to bias the piston member into an extended orientation, as shown by depth release mechanism 416.

The ballast weight 420 couples to the ballast attachment block, at least in part, by way of the retention portion 922 of the piston member 918. More particularly, when the piston member 918 is fully extended, the internal annular groove 908 of the counter bore 906 is in operational relationship to the external annular groove 924 of the retention portion 922. The radial spring 910 couples between the internal annular groove 908 of the counter bore 906 and the external annular groove 924 of the retention portion. In accordance at least some embodiments, friction between the radial spring 910 and the annular grooves creates a latching force to hold the ballast weight 420 when the in the abutting relationship in operation (e.g., use during a marine survey).

In at least some embodiments, when the ballast system 210 is at the surface, the piston member 918 will tend to be in its most extend orientation (i.e., in the non-triggered state). As the ballast system 210 increases depth in the water, increased pressure (communicated at least in part through the aperture 904 and counter bore 906) will tend to force the piston member 918 to retract into the chamber 920. The gas within the chamber 920 compresses with greater retraction, and thus tends to resist movement. Likewise, the illustrative coil spring 918 develops more force with compression, also tending to resist movement. Further still, the radial spring 910 provides frictional forces that resist movement of the piston member 918.

However, when the ballast system 210 reaches or exceeds the predetermined depth, the force applied to the piston member 918 overcomes the various latching forces resisting movement of the piston member 918. In a least some embodiments the radial spring 910 is deformable, and thus while being sufficiently resilient to hold the ballast weight 420 in the abutting relationship, the force exerted by the water at sufficient depth eventually deforms the radial spring 910 to the point the piston member 918 can slide past the radial spring 910 and fully retract (i.e., transition to the triggered state). Once the piston member 918 slides past the radial spring 910, the ballast weight 420 is effectively released, and can fall away.

While the depth release mechanism 416 is shown in the non-triggered state, depth release mechanism 418 is shown in the triggered state. That is, the piston member 940 of depth release mechanism 418 is shown in a fully retracted orientation, having slid past the radial spring 942.

Figure 10:
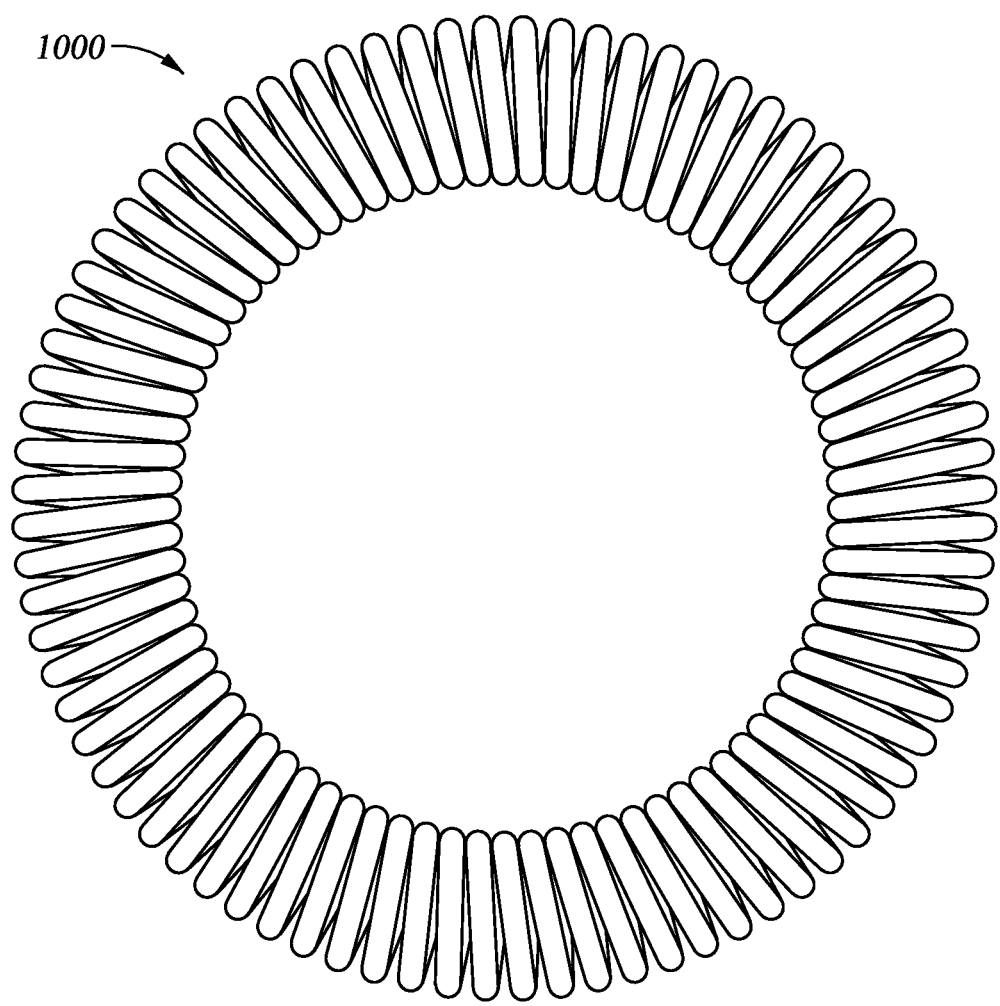
FIG. 10 shows an overhead view of a radial spring in accordance with at least some embodiments.

FIG. 10 shows an overhead view of radial spring 1000 (i.e., a coil spring wrapped into a toroidal shape). The radial spring 1000 is illustrative of radial spring 910, as well as radial spring 824. The wire of the coil spring 1000 provides resistance to deformation by shear forces, but will eventual deform sufficiently to enable changes in the state of depth trigger mechanisms from non-triggered states to triggered states. The radial springs may be constructed of any suitable material, such as copper-based alloys (e.g., beryllium copper, bronze), or stainless steel.

Figure 11:
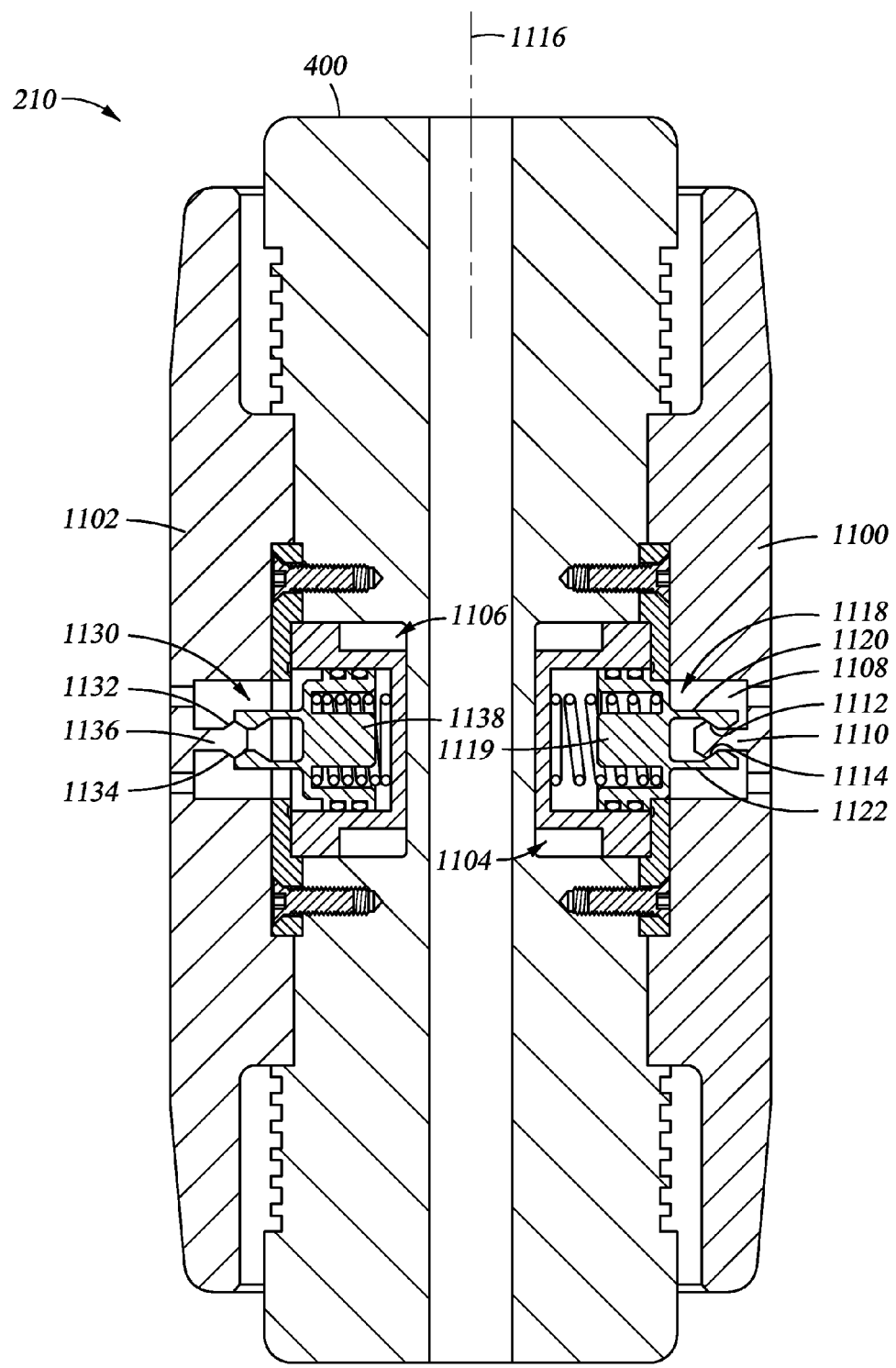
FIG. 11 shows a cross-sectional elevation view of a ballast system in accordance with at least some embodiments.

FIG. 11 shows a cross-sectional elevation view of a ballast system 210 in accordance with still further embodiments. In particular, FIG. 11 shows the ballast attachment block 400 having the first ballast weight 1100 and second ballast weight 1102 in an abutting relationship. The ballast weights 1100 and 1102 are latched to the ballast attachment block by way of a depth release mechanisms 1104 and 1106, respectively. With respect to the piston within each depth release mechanism, and how increasing pressure with depth forces each piston inwardly, the depth release mechanism work similarly to those of FIG. 9, and thus a description will not be repeated here so as not to unduly complicate the discussion. However, with respect to creation of the latching force that resists movement of the piston, the latching forces in the illustrative FIG. 11 are created by interaction of a leaf spring with an interaction surface.

In particular, depth release mechanism 1104 is shown in a non-triggered state. The ballast weight 1100 defines a counter bore 1108 within which an interaction member 1110 is disposed. In the illustrative case of FIG. 11, the interaction member 1110 is rigidly coupled to the ballast weight 1100. The interaction member 1110 defines a first interaction surface 1112 and a second interaction surface 1114. Interaction surface 1112 defines a plane (but in the view of FIG. 11, the plane is a line). The plane defined by the interaction surface 1112, if extended to intersect the central axis 1116 of the ballast block 400, would form an acute angle on the side where the depth release mechanism 1104 is located. Interaction surface 1114 also defines a plane (but in the view of FIG. 11, the plane is a line). The plane defined by the interaction surface 1114, if extended to intersect the central axis 1116 of the ballast block 400, would form an acute angle on the side where the depth release mechanism 1104 is located.

The depth release mechanism 1104 further comprises a leaf spring member 1118 rigidly coupled to the piston member 1119. That is, as the piston member moves inwardly, the leaf spring member 1118 moves with the piston member 1119. The illustrative leaf spring member 1118 comprises a first leaf spring 1120 and a second leaf spring 1122. The first leaf spring 1120 defines a fixed proximal end (abutting the piston assembly) and a distal end in operational relationship with the interaction surface 1112 of the interaction member 1110. The second leaf spring 1122 defines a fixed proximal end (abutting the piston assembly) and a distal end in operational relationship with the interaction surface 1114 of the interaction member 1110. Interaction of the leaf springs 1120 and 1122 with their respective interaction surfaces 1112 and 1114 creates a latching force that tends to hold the piston member 1119 in the non-triggered state. Correspondingly, the latching force also holds the ballast weight 1100 against the ballast attachment block 1100.

As with the embodiments discussed above in reference to the depth trigger mechanisms for the lifting bag system, when the depth of the ballast system reaches or exceeds the predetermined depth, the amount of latching force supplied by the leaf springs 1120 and 1122 is overcome, which forces the depth release mechanism 1104 into a triggered state, releasing the ballast weight 1100. The depth release mechanism 1106 (left side of FIG. 11) is shown in the triggered state. In particular, the leaf springs of the leaf spring member 1130 have moved beyond the interaction surfaces 1132 and 1134 of the interaction member 1136, and thus the ballast weight 1102 is released (though still shown in place for purposes of explanation). While illustrative FIG. 11 shows the leaf spring members 1118 and 1130 rigidly coupled to piston members 1119 and 1138, respectively, the locations may be reversed. That is, the interaction members 1110 and 1136 may be rigidly coupled to the piston members 1119 and 1138, respectively, and the leaf spring members 1118 and 1130 may be rigidly coupled to the ballast weights 1100 and 1102, respectively.

Figure 12:
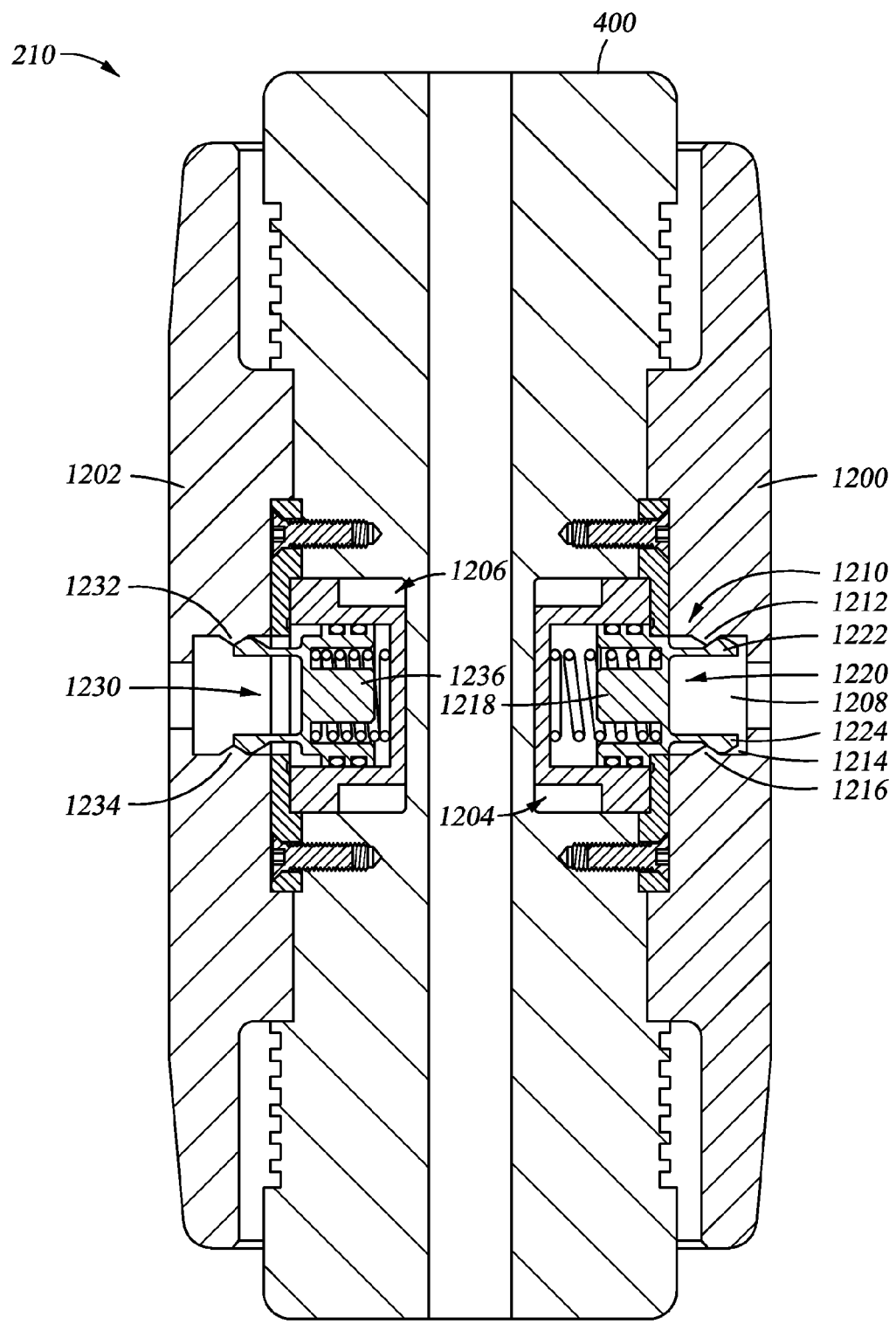
FIG. 12 shows a cross-sectional elevation view of a ballast system in accordance with at least some embodiments.

FIG. 12 shows a cross-sectional elevation view of a ballast system 210 in accordance with still further embodiments. In particular, FIG. 12 shows the ballast attachment block 400 having the first ballast weight 1200 and second ballast weight 1202 in an abutting relationship. The ballast weights 1200 and 1202 are latched to the ballast attachment block 400 by way of a depth release mechanisms 1204 and 1206, respectively. With respect to the piston within each depth release mechanism, and how increasing pressure with depth forces each piston inwardly, the depth release mechanism work similarly to those of FIG. 9, and thus a description will not be repeated here so as not to unduly complicate the discussion. However, with respect to creation of the latching force that resists movement of the piston, the latching forces in the illustrative FIG. 12 are created by interaction of a leaf spring with an interaction surface.

In particular, depth release mechanism 1204 is shown in a non-triggered state. The ballast weight 1200 defines a counter bore 1208 within which an interaction member 1210 is disposed on the inside diameter. In the illustrative case of FIG. 12, the interaction member 1210 is rigidly coupled to the ballast block, and is defined as an annular ridge 1212. Alternatively, the interaction member may be thought of as an annular groove 1214. The interaction member 1210 defines an interaction surface 1216. As illustrated, the interaction surface 1216 defines a conic frustum whose larger diameter portion opens away from the piston member 1218.

The depth release mechanism 1204 further comprises a leaf spring member 1220 rigidly coupled to the piston member 1218. That is, as the piston member moves inwardly, the leaf spring member 1220 moves with the piston member 1218. The illustrative leaf spring member 1220 comprises a plurality of first leaf springs, arranged into a circular cylinder, but only a first leaf spring 1222 and second leaf spring 1224 are visible in FIG. 12. Illustrative of all the leaf springs, the first leaf spring 1222 defines a fixed proximal end (abutting the piston assembly) and a distal end in operational relationship with the interaction surface 1216 of the interaction member 1210. Interaction of the leaf springs with the interaction surface 1216 creates a latching force that tends to hold the piston member 1218 in the non-triggered state. Correspondingly, the latching force also holds the ballast weight 1200 against the ballast attachment block 400.

As with the embodiments discussed above in reference to the depth trigger mechanisms for the lifting bag system, when the depth of the ballast system reaches or exceeds the predetermined depth, the amount of latching force supplied by the leaf spring against the interaction surface 1216 is overcome, which forces the depth release mechanism 1204 into a triggered state, releasing the ballast weight 1200. The depth release mechanism 1206 (left side of FIG. 12) is shown in the triggered state. In particular, the leaf springs of the leaf spring member 1230 have moved beyond the interaction surface 1232 of the interaction member 1234, and thus the ballast weight 1202 is released (though still shown in place for purposes of explanation). While illustrative FIG. 12 shows the leaf spring members 1220 and 1230 rigidly coupled to piston members 1218 and 1236, respectively, the locations may be reversed. That is, the interaction surface may be defined on an interaction member rigidly coupled to the piston members 1218 and 1236, and the leaf spring members 1220 and 130 may be rigidly coupled to the ballast weights 1200 and 1202, respectively.

Figure 13:
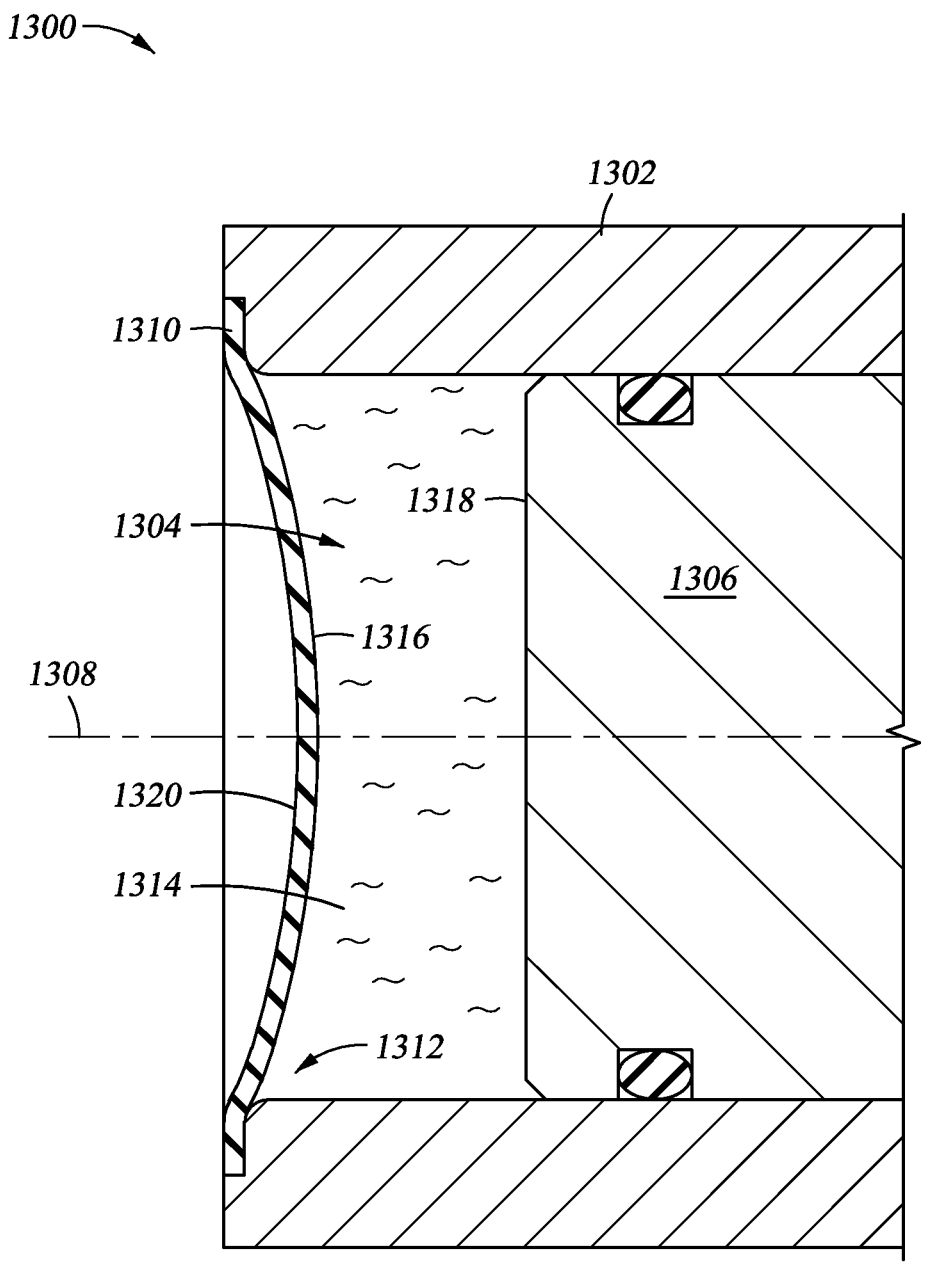
FIG. 13 shows a depth trigger mechanism in accordance with at least some embodiments.

In the embodiments of the depth trigger mechanism for the lifting bag system, the discussion has indicated that the pistons are exposed to the pressure of the water such that increasing pressure moves the piston, eventually from a non-triggered state to a triggered state where the seal on the gas cylinder is punctured. In some cases, the piston is directly exposed to the sea water and pressure, but in other cases the piston may be shielded from the sea water, but nevertheless exposed to the increasing pressure. FIG. 13 shows a cross-sectional view of a portion of a depth trigger mechanism 1300 to discuss various embodiments of shielding the piston from the sea water. In particular, the depth trigger mechanism 1300 comprises an outer housing 1302 that has counter bore 1304 within which piston 1306 is located. The piston 1306 defines a central axis 1308 along which the piston moves with changing ambient pressure. The depth trigger mechanism 1300 further comprises a resilient member 1310 coupled over the aperture 1312 defined by the counter bore 1304. More particularly, the resilient member 1310 is sealed against the outer housing 1302 such that the resilient member 1310 fluidly isolates the volume 1314 from the ambient sea water. The volume 1314 defined by the inside surface 1316 of the resilient member 1310 and outer face 1318 of the piston is filled with a non-compressible fluid, such as oil, filtered water, or alcohol. The resilient material may be any suitable material, such as rubber or resilient plastic.

In operation, ambient pressure of the sea water presses against the outer surface 1320 of the resilient member 1310. Responsive to the pressure, the resilient material presses on the non-compressible fluid 1314, which in turn presses against the outer face 1318 of the piston 1306. Movement of the piston caused by the increases in ambient pressure change the operational state from non-triggered to triggered as discussed for the various embodiments above. However, because the piston is not exposed to the sea water, the piston is less likely to experience fouling, such as by barnacles. Moreover, if the piston is not exposed to sea water, the choice of materials for the piston increases from not only the copper-based alloys, but also stainless steels and even high density plastics.

Figure 14:
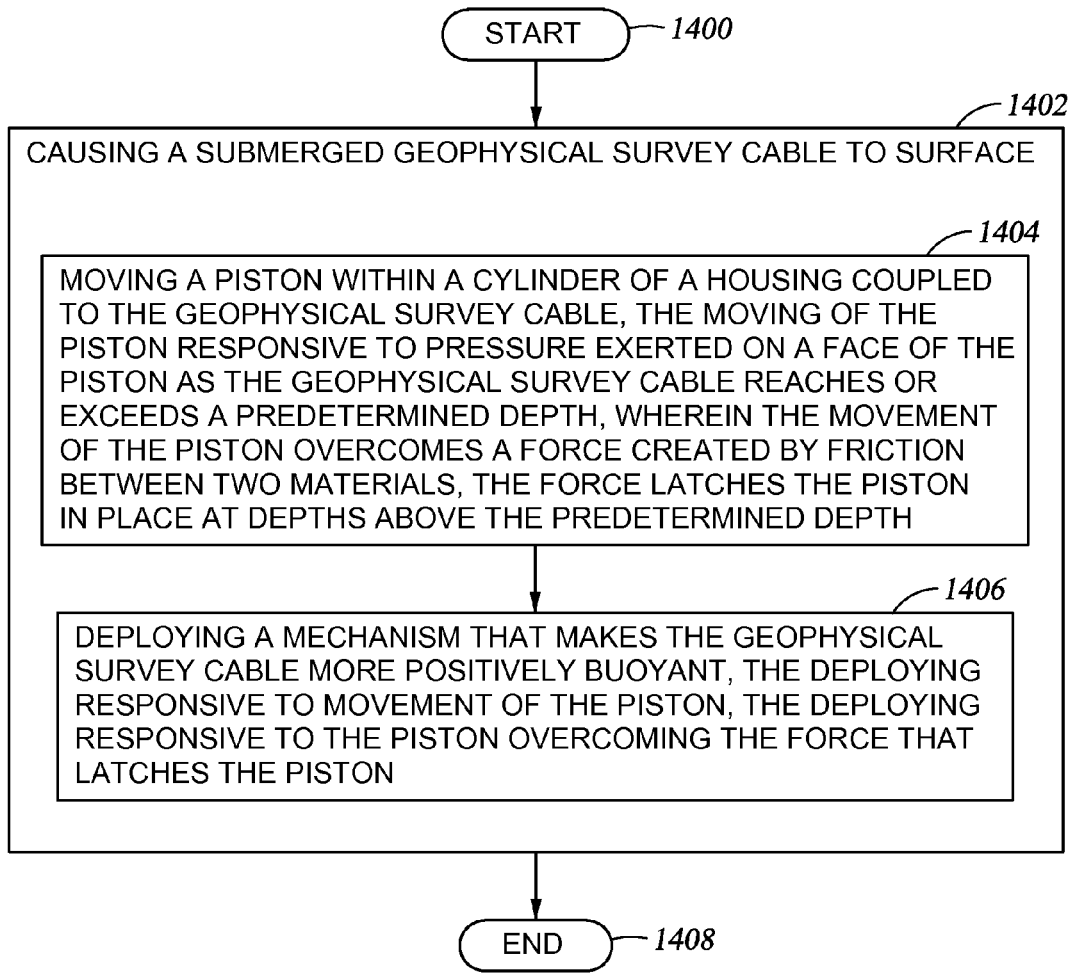
FIG. 14 shows a method in accordance with at least some embodiments.

FIG. 14 shows a method in accordance with at least some embodiments. In particular, the method starts (block 1400) and comprises causing a submerged geophysical survey cable to surface (block 1402). Causing the geophysical survey cable to surface may comprise: moving a piston within a cylinder of a housing coupled to the geophysical survey cable, the moving of the piston responsive to pressure exerted on a face of the piston as the geophysical survey cable reaches or exceeds a predetermined depth, wherein the movement of the piston overcomes a force created by friction between two metallic materials, the force latches the piston in place at depths above the predetermined depth (block 1404); and deploying a mechanism that makes the geophysical survey cable more positively buoyant, the deploying responsive to movement of the piston, the deploying responsive to the piston overcoming the force that latches the piston (block 1406). Thereafter, the method ends (block 1408).

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, a retriever system may comprise just a lifting bag system, or just a ballast weight system. It is intended that the following claims be interpreted to embrace all such variations and modifications.

We claim:

1. A method comprising:
    causing a submerged geophysical survey cable to surface by
        moving a piston within a cylinder of a housing coupled to the geophysical survey cable, the moving of the piston responsive to pressure exerted on a face of the piston as the geophysical survey cable reaches or exceeds a predetermined depth; and responsive to movement of the piston
        deflecting a leaf spring responsive to relative movement between the leaf spring and an interaction surface, wherein the movement of the piston overcomes a force created by interaction the leaf spring and the interaction surface, the force latches the piston in place at depths above the predetermined depth; and when the interaction surface is no longer in operational relationship with the leaf spring
        puncturing a seal of a compressed gas cylinder by movement of a lance, wherein movement of the lance is caused by movement of the piston; and thereby
        deploying a mechanism that makes the geophysical survey cable more positively buoyant.

2. The method of claim 1 wherein lance is coupled to the piston.

3. The method of claim 1 wherein deflecting the spring further comprises deflecting a leaf spring defining a proximal end rigidly coupled to the piston, and a distal end that interacts with the interaction surface rigidly coupled to the housing.

4. The method of claim 1 wherein deflecting the spring further comprises deflecting a leaf spring defining a proximal end rigidly coupled to the housing, and a distal end that interacts with the interaction surface rigidly coupled to the piston.

5. The method of claim 1 wherein deflecting the leaf spring further comprises deflecting the leaf spring away from a central axis of the cylinder.

6. A method comprising:
    causing a submerged geophysical survey cable to surface by
        moving a piston within a cylinder of a housing coupled to the geophysical survey cable, the moving of the piston responsive to pressure exerted on a face of the piston as the geophysical survey cable reaches or exceeds a predetermined depth;
        deflecting a first leaf spring responsive to relative movement between the first leaf spring and a first interaction surface in operational relationship with the first leaf spring, the first leaf spring rigidly coupled to the housing and the first interaction surface rigidly coupled to the piston;
        deflecting a second leaf spring responsive to relative movement between the second leaf spring and a second interaction surface in operational relationship with the second leaf spring, the second leaf spring rigidly coupled to the housing and the second interaction surface rigidly coupled to the piston;
        wherein the movement of the piston overcomes a force created by interaction of the first leaf spring with first interaction surface and by interaction of the second leaf spring with the second interaction surface, the force latches the piston in place at depths above the predetermined depth; and when the interaction surfaces are no longer in operational relationship with the leaf springs
        puncturing a seal of a compressed gas cylinder by movement of a lance, wherein movement of the lance is caused by movement of the piston; and thereby
        deploying a mechanism that makes the geophysical survey cable more positively buoyant.

7. A method comprising:
    causing a submerged geophysical survey cable to surface by
        moving a piston within a cylinder of a housing coupled to the geophysical survey cable, the moving of the piston responsive to pressure exerted on a face of the piston as the geophysical survey cable reaches or exceeds a predetermined depth;
        deflecting a first leaf spring responsive to relative movement between the piston and a first interaction surface in operational relationship with the first leaf spring, the first leaf spring rigidly coupled to the piston and the first interaction surface rigidly coupled to the housing;
        deflecting a second leaf spring responsive to relative movement between the piston and a second interaction surface in operational relationship with the second leaf spring, the second leaf spring rigidly coupled to the piston and the second interaction surface rigidly coupled to the housing;
        wherein the movement of the piston overcomes a force created by interaction of the first leaf spring with first interaction surface and by interaction of the second leaf spring with the second interaction surface, the force latches the piston in place at depths above the predetermined depth; and when the interaction surfaces are no longer in operational relationship with the leaf springs
        puncturing a seal of a compressed gas cylinder by movement of a lance, wherein movement of the lance is caused by movement of the piston; and thereby
        deploying a mechanism that makes the geophysical survey cable more positively buoyant.

8. A method comprising:
    causing a submerged geophysical survey cable to surface by
        moving a piston within a cylinder of a housing coupled to the geophysical survey cable, the moving of the piston responsive to pressure exerted on a face of the piston as the geophysical survey cable reaches or exceeds a predetermined depth;
        deforming a coil spring disposed within a first annular groove on an inside diameter of an aperture of the housing, and the coil spring also disposed in a second annular groove on an outside diameter of an extension member coupled to the piston;
        wherein the movement of the piston overcomes a force created by interaction between the coil spring and the annular grooves, the force latches the piston in place at depths above the predetermined depth; and when the coil spring is no longer in operational relationship with at least one of the annular grooves puncturing a seal of a compressed gas cylinder by movement of a lance, wherein movement of the lance is caused by movement of the piston; and thereby deploying a mechanism that makes the geophysical survey cable more positively buoyant.

9. A system comprising:
a bag attachment block defining two ends, and at least one end configured to couple a marine geophysical survey cable;
a lifting bag coupled to the bag attachment block, the lifting bag deflated;
a gas cylinder coupled to the bag attachment block, the gas cylinder storing a compressed gas and having a seal; and
a depth trigger mechanism coupled to the bag attachment block and the gas cylinder, the depth trigger mechanism comprising
a housing defining a cylinder;
a piston disposed within the cylinder, the piston defining an outer face exposed to ambient pressure;
a lance member disposed within the housing;
a first leaf spring defining a fixed proximal end, and a distal end;
a first interaction surface in operational relationship with the distal end of the first leaf spring;
wherein at depths in water above a predetermined depth, interaction between the first leaf spring and the first interaction surface creates a latching force that holds the piston in a non-triggered state; and
wherein at the predetermined depth and below pressure acting on the face of the piston creates a force that overcomes the latching force and that moves the piston to a triggered state that causes the lance member to puncture the seal of the gas cylinder.

10. The system of claim 9 wherein the fixed proximal end of the leaf spring is rigidly coupled to the piston, and the interaction surface is rigidly coupled to the housing.

11. The system of claim 9 wherein the fixed proximal end of the leaf spring is rigidly coupled to the housing, and the interaction surface is rigidly coupled to the piston.

12. The system of claim 9 wherein the lance is rigidly coupled to the piston.

13. The system of claim 9 further comprising:
a second leaf spring defining a fixed proximal end and a distal end;
a second interaction surface in operational relationship with the second leaf spring;
wherein at depths in water above the predetermined depth, the first and second leaf spring are deflected away from a central axis of the piston by the first and second interaction surfaces, respectively.

14. The system of claim 13:
wherein the fixed proximal end of the first leaf spring is rigidly coupled to the piston, and the first interaction surface is rigidly coupled to the housing; and
wherein the fixed proximal end of the second leaf spring is rigidly coupled to the piston, and the second interaction surface is rigidly coupled to the housing.

15. The system of claim 13:
wherein the fixed proximal end of the first leaf spring is rigidly coupled to the housing, and the first interaction surface is rigidly coupled to the piston; and
wherein the fixed proximal end of the second leaf spring is rigidly coupled to the housing, and the second interaction surface is rigidly coupled to the piston.

16. The system of claim 9:
wherein the first interaction surface is an annular groove on an inside diameter of a bore in the housing;
wherein the first leaf spring defining a protrusion that interacts with the annular groove, and wherein the first leaf spring deflects toward a central axis of the piston as the piston moves.

17. A system comprising:
a bag attachment block defining two ends, and at least one end configured to couple a marine geophysical survey cable;
a lifting bag coupled to the bag attachment block, the lifting bag deflated;
a gas cylinder coupled to the bag attachment block, the gas cylinder storing a compressed gas and having a seal; and
a depth trigger mechanism coupled to the bag attachment block and the gas cylinder, the depth trigger mechanism comprising
a housing defining a cylinder;
a piston disposed within the cylinder, the piston defining an outer face exposed to ambient pressure;
a lance member disposed within the housing;
a first annular groove associated with the piston;
a second annular groove associated with the cylinder, the first annular groove aligned with the second annular groove;
a coil spring disposed partially within the first annular groove, and disposed partially within the second annular groove;
wherein at depths in water above a predetermined depth, interaction between the coil spring and the annular grooves creates a latching force that holds the piston in a non-triggered state; and
wherein at the predetermined depth and below pressure acting on the face of the piston creates a force that overcomes the latching force and that moves the piston to a triggered state that causes the lance member to puncture the seal of the gas cylinder.

18. The system of claim 17 further comprising:
a rod coupled to the piston, wherein the first annular groove is defined on an outside diameter of the rod; and
an aperture within the housing, the second annular groove is defined on an inside diameter of the aperture.

19. The system of claim 18 wherein the lance is coupled to the rod.

20. The system of claim 17 further comprising:
a counter bore defined in the piston, wherein the first annular groove is defined on an inside diameter of the counter bore; and
a rod defining a proximal end coupled to the housing and a distal end that extends into the counter bore of the piston, the second annular groove is defined on the outside diameter of the rod.

21. The system of claim 20 further comprising:
a counter-bore along a longitudinal axis of the rod;
wherein the lance is coupled to the piston, and extends at least partially into the counter-bore.

22. A ballast system comprising:
a ballast attachment block comprising:
a first end and a second end, each end defining an outside diameter configured to couple to an inside diameter of a geophysical survey cable;
a first attachment location medially disposed on the ballast attachment block;
a passage extending between the first end and the second end, the passage disposed within the ballast attachment block;
a first ballast weight abutting the first attachment point, the first ballast weight defining an first aperture;

a first depth release mechanism coupling the first ballast weight to the ballast attachment block, the first depth release mechanism comprising
- a piston disposed within a cylinder defined in the ballast attachment block, the piston defining an outer face exposed to ambient pressure;
- a first leaf spring defining a fixed proximal end, and a distal end;
- a first interaction surface in operational relationship with the distal end of the first leaf spring;
- wherein at depths in water above a predetermined depth, interaction between the first leaf spring and the first interaction surface creates a latching force that holds the piston in a non-triggered state; and
- wherein at the predetermined depth and below pressure acting on the face of the piston creates a force that overcomes the latching force and that moves the piston to a triggered state that causes the first ballast weight to be released from the first attachment point.

23. The system of claim 22 wherein the fixed proximal end of the leaf spring is rigidly coupled to the piston, and the first interaction surface is rigidly coupled to an aperture within the first ballast weight.

24. The system of claim 22 wherein the fixed proximal end of the leaf spring is rigidly coupled to the first ballast weight, and the interaction surface is rigidly coupled to the piston.

25. The system of claim 22:
- wherein the first interaction surface is an annular groove on an inside diameter of an aperture in the first ballast weight; and
- wherein the first leaf spring interacts with the annular groove, and wherein the first leaf spring deflects toward a central axis of the piston as the piston moves.

26. A ballast system comprising:
- a ballast attachment block comprising:
    - a first end and a second end, each end defining an outside diameter configured to couple to an inside diameter of a geophysical survey cable;
    - a first attachment location medially disposed on the ballast attachment block;
    - a passage extending between the first end and the second end, the passage disposed within the ballast attachment block;
- a first ballast weight abutting the first attachment point, the first ballast weight defining an first aperture;
- a first depth release mechanism coupling the first ballast weight to the ballast attachment block, the first depth release mechanism comprising
    - a piston disposed within a cylinder defined in the ballast attachment block, the piston defining an outer face exposed to ambient pressure;
    - a first annular groove associated with the piston;
    - a second annular groove associated with the cylinder, the first annular groove aligned with the second annular groove;
    - a coil spring disposed partially within the first annular groove, and disposed partially within the second annular groove;
    - wherein at depths in water above a predetermined depth, interaction between the coil spring and the annular grooves creates a latching force that holds the piston in a non-triggered state; and
    - wherein at the predetermined depth and below pressure acting on the face of the piston creates a force that overcomes the latching force and that moves the piston to a triggered state the first ballast weight to be released from the first attachment point.

27. The system of claim 26:
wherein the first annular groove is defined on an outside diameter of the piston; and
an aperture in the first ballast weight, the second annular groove is defined on an inside diameter of the aperture.

28. The system of claim 27 further comprising:
a counter-bore defined in the piston, wherein the first annular groove is defined on an inside diameter of the counter bore; and
a rod defining a proximal end coupled to the first ballast weight and a distal end that extends into the counter-bore of the piston, the second annular groove is defined on the outside diameter of the rod.

\* \* \* \* \*